(12) United States Patent
Joyce

(10) Patent No.: US 8,231,301 B1
(45) Date of Patent: Jul. 31, 2012

(54) FURNITURE SYSTEMS

(75) Inventor: Jared L. Joyce, Bozeman, MT (US)

(73) Assignee: Edison Nation, LLC, Charlotte, NC (US)

( * ) Notice: Subject to any disclaimer, the term of this patent is extended or adjusted under 35 U.S.C. 154(b) by 0 days.

(21) Appl. No.: 12/653,169

(22) Filed: Dec. 9, 2009

Related U.S. Application Data

(62) Division of application No. 11/218,859, filed on Sep. 2, 2005, now Pat. No. 7,641,414.

(60) Provisional application No. 60/606,947, filed on Sep. 4, 2004, provisional application No. 60/714,059, filed on Sep. 1, 2005.

(51) Int. Cl.
*F16B 21/02* (2006.01)

(52) U.S. Cl. .......................... 403/348; 403/349; 403/353

(58) Field of Classification Search .................. 403/231, 403/348–351, 353, 381, 382, 295, 403; 217/65; 220/4.31, 541, 542, 547, 548, 618, 521, 677; 211/186, 189, 194, 134; 312/107, 108, 257.1, 312/263, 265.5, 193; 144/347, 354; 52/590.1, 52/590.2, 591.1, 656.9
See application file for complete search history.

(56) References Cited

U.S. PATENT DOCUMENTS

| | | | |
|---|---|---|---|
| 291,032 A | 1/1884 | Cleland | |
| 348,252 A | 8/1886 | Walsh | |
| 471,697 A | 3/1892 | Mosbacher | |
| 706,763 A | 8/1902 | Lange | |
| 1,534,468 A | 4/1925 | Shea, Jr. | 403/382 |
| 1,833,081 A | 11/1931 | Kilmer | |
| 2,279,864 A | 4/1942 | Eide | |
| 2,562,497 A | 7/1951 | Klein | |
| 3,021,187 A | 2/1962 | Mitchell | |
| 3,379,483 A | 4/1968 | Oldford | |
| 3,549,019 A | 12/1970 | Wood et al. | |
| 3,612,289 A | 10/1971 | Zink | |
| 3,625,163 A | 12/1971 | Grossman | |
| 3,664,011 A | 5/1972 | Labastrou | |
| 3,784,273 A | 1/1974 | Nikolai | |
| 3,806,124 A | 4/1974 | Ippen et al. | |
| 3,885,675 A | 5/1975 | Hultenby et al. | |
| 4,015,716 A | 4/1977 | Nichols | |
| 4,044,448 A | 8/1977 | Watanabe et al. | |
| 4,110,946 A | 9/1978 | Louther, Jr. | |
| 4,158,421 A | 6/1979 | Chi | |
| 4,596,195 A | 6/1986 | Wenger | |
| 4,651,651 A | 3/1987 | Sheffer | |
| 4,739,887 A | 4/1988 | Beach | |
| 4,750,794 A | 6/1988 | Vegh | |
| 4,782,972 A | 11/1988 | Wenkman et al. | |
| 4,937,993 A | 7/1990 | Hitchins | |
| 5,114,265 A | 5/1992 | Grisley | |
| 5,328,289 A | 7/1994 | Fussler | |
| 5,423,357 A | 6/1995 | Szymanski | |
| 5,499,886 A | 3/1996 | Short et al. | |
| 5,653,366 A | 8/1997 | Liserre | |

(Continued)

*Primary Examiner* — Victor MacArthur

(74) *Attorney, Agent, or Firm* — Tillman Wright, PLLC; James D. Wright; Chad D. Tillman

(57) ABSTRACT

Asymmetrical joint systems, structures having interlocking joints, methods of fabricating asymmetric joint systems and methods for fabricating structures having interlocking joints. In a preferred embodiment, the invention a joint system comprising an asymmetrical mortise into which an asymmetrical tenon fits. In another preferred embodiment, the invention is a quadrilateral structure that incorporates a diamond-shaped bracing system. In another preferred embodiment, the invention is a quadrilateral structure that incorporates a rotational lockdown component.

6 Claims, 18 Drawing Sheets

U.S. PATENT DOCUMENTS

| | | |
|---|---|---|
| 5,688,030 A | 11/1997 | McAnally et al. |
| 5,803,561 A | 9/1998 | Puehlhorn |
| 6,004,065 A | 12/1999 | Higdon et al. |
| 6,127,019 A | 10/2000 | Means |
| 6,164,477 A | 12/2000 | Druckman et al. |
| 6,283,668 B1 | 9/2001 | Norek |
| 6,325,568 B1 | 12/2001 | Druckman et al. |
| 6,413,007 B1 | 7/2002 | Lambright |
| 6,637,608 B1 | 10/2003 | Schneider |
| 6,675,979 B2 | 1/2004 | Taylor |
| 6,726,397 B2 | 4/2004 | Kuehn et al. |
| 7,473,048 B2 * | 1/2009 | Nakamura et al. ............. 403/56 |

* cited by examiner

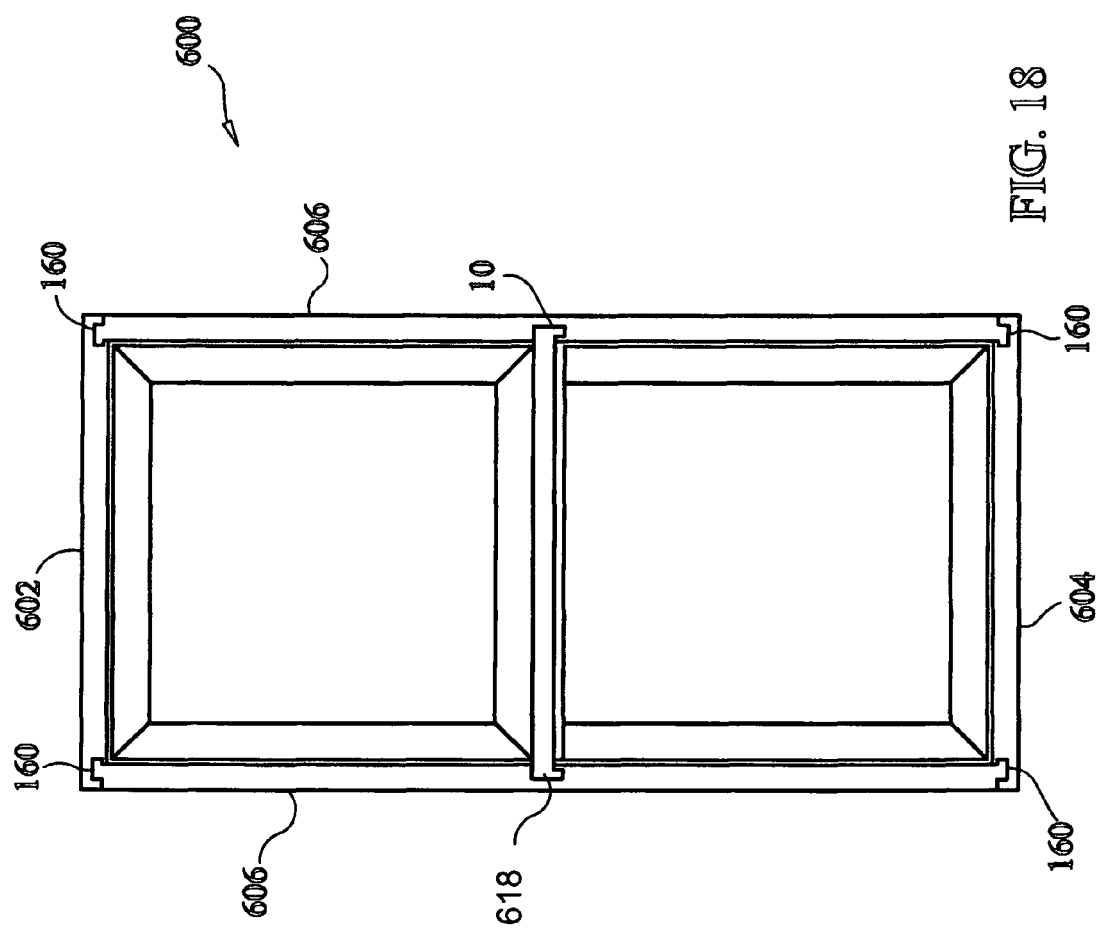

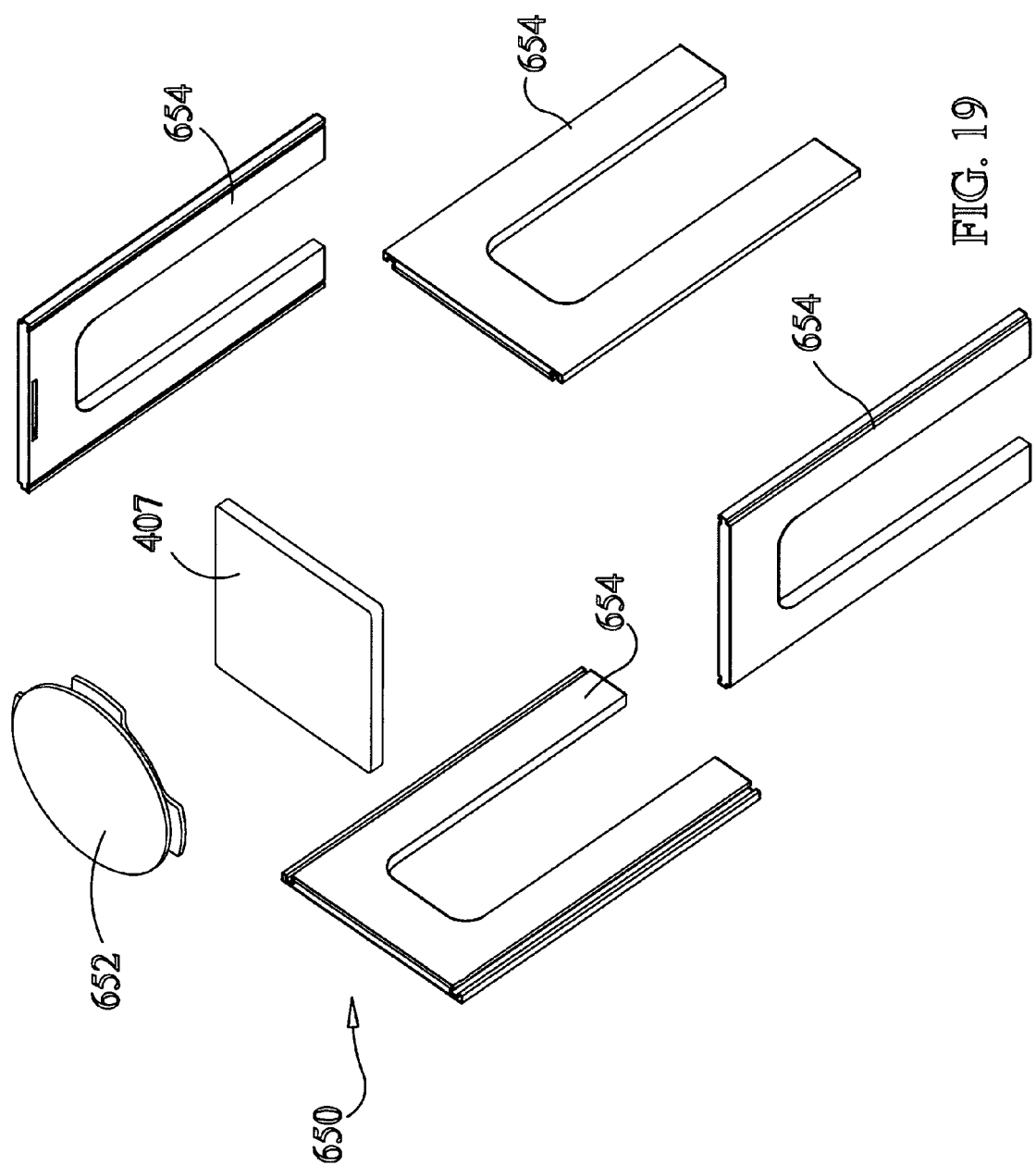

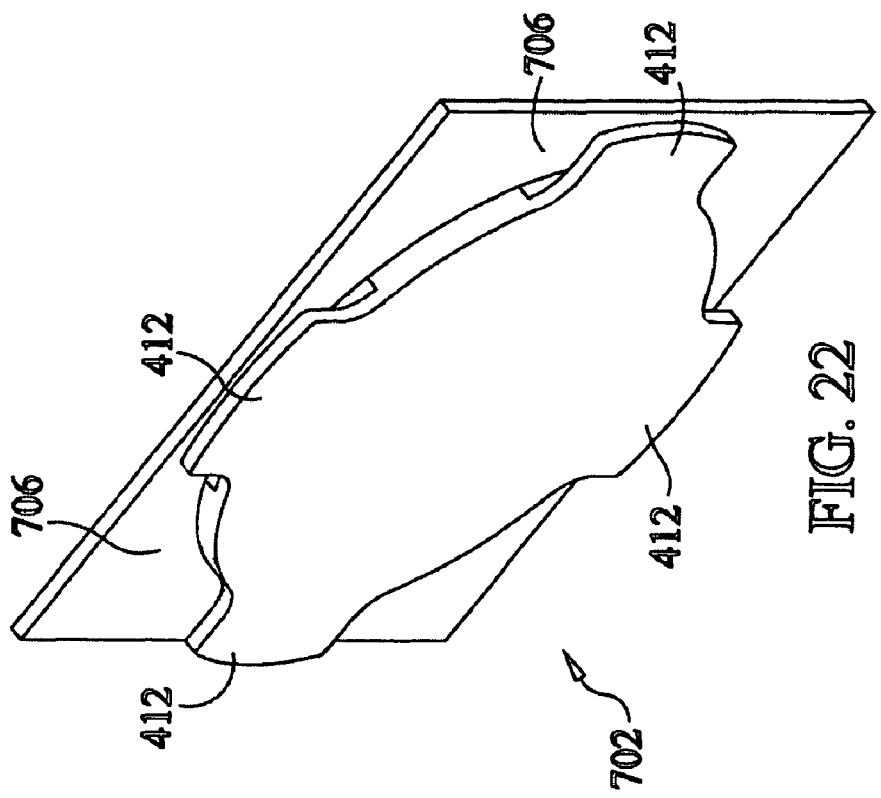
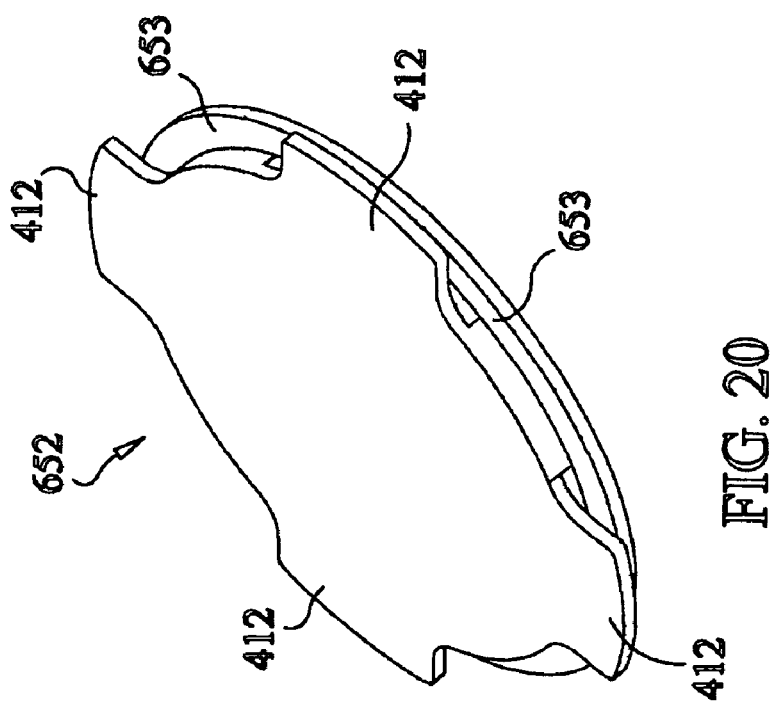

FURNITURE SYSTEMS

CROSS-REFERENCE TO RELATED APPLICATIONS

This application is a divisional application of U.S. patent application Ser. No. 11/218,859, filed Sep. 2, 2005 now U.S. Pat. No. 7,641,414, which claims the benefit of U.S. Provisional Patent Application No. 60/606,947, filed Sep. 4, 2004, and U.S. Provisional Application No. 60/714,059, filed Sep. 1, 2005, the disclosures of which patent applications are incorporated by reference as if fully set forth herein.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

This invention relates to furniture systems and structures having interlocking joints. In particular, the invention relates to asymmetrical joint systems and furniture having interlocking components.

The background art is characterized by U.S. Pat. Nos. 291,032; 348,252; 471,697; 706,763; 1,534,468; 1,833,081; 2,279,864; 2,562,497; 3,021,187; 3,379,483; 3,549,019; 3,612,289; 3,625,163; 3,664,011; 3,784,273; 3,806,124; 3,885,675; 4,015,716; 4,044,448; 4,110,946; 4,158,421; 4,596,195; 4,651,651; 4,739,887; 4,750,794; 4,782,972; 4,937,993; 5,114,265; 5,328,289; 5,423,357; 5,499,886; 5,653,366; 5,688,030; 5,803,561; 6,004,065; 6,127,019; 6,164,477; 6,283,668; 6,325,568; 6,413,007; 6,637,608; 6,675,979 and 6,726,397; the disclosures of which patents are incorporated by reference as fully set forth herein.

Sheffer in U.S. Pat. No. 4,651,651 discloses shelving units. This invention is limited in that it incorporates shelving joints that have six contacting surfaces. Moreover, the joint mortises are formed by lamination.

Short et al. in U.S. Pat. No. 5,499,886 discloses a coupling assembly for furniture components. This invention is limited in that it incorporates a T-shaped tenon.

Liserre in U.S. Pat. No. 5,653,366 discloses a locking storage container. This invention is limited in that it incorporates a flush joint that has six contacting surfaces (see his FIG. 3).

Lambright in U.S. Pat. No. 6,413,007 discloses a joint assembly. This invention is limited in that is discloses a flange joint that has five contacting surfaces.

BRIEF SUMMARY OF THE INVENTION

The purpose of the invention is to provide joint systems and interlocking joints for quadrilaterals (four-sided structures) and other structures. One advantage is that conventional router bits can be used to construct the joint systems disclosed herein. Another advantage of the invention is that no tools are required to assemble the furniture kits disclosed herein.

The invention involves asymmetrical joints and other interlocking structural components and structures that incorporate them, including a diamond back bookshelf, a rotational lockdown cube, a stool and a pedestal. These inventions provide joint systems and structural components that can be incorporated into a variety of quadrilaterals and other structures.

These joint systems are preferably created by using two symmetrical router bits with the second router bit passing over part of the path of the first router bit path, creating an asymmetric path, and, thus, an asymmetric joint. Preferred router bits to be used to construct the joint systems disclosed herein are a conventional T-slot cutter and a straight slot cutter. Moreover, the asymmetric joints disclosed herein are of a three-axis design making the cutting of these joints possible without removing the material from the table of a computer numeric controlled (CNC) milling machine.

In a preferred embodiment, the invention is a joint system comprising: an asymmetrically-shaped female component having a first set of dimensions; and an asymmetrically-shaped male component that interlocks with said female component, said asymmetrically-shaped male component having a second set of dimensions; wherein said asymmetrically-shaped female component has at least seven surfaces and said asymmetrically-shaped male component has at least seven connecting surfaces that contact said at least seven surfaces when the joint system is assembled. Preferably, said female component and said male components are fabricatable with a router that is capable of cutting a slot having the shape of a right prism. Preferably, said female component is fabricatable from a first workpiece having one thickness and said male component is fabricatable from a second workpiece having substantially the same thickness; and wherein said dimensions are a multiple of about one sixth or about one third of said same thickness. Preferably, each of said first set of dimensions and each of said second set of dimensions are substantially equal to two thirds, one third or one sixth of said thickness. Preferably, the female component makes up about half of the material within the joint proper and the male component makes up about half of the material within the joint proper.

In another preferred embodiment, the invention is a quadrilateral structure that incorporates a diamond-shaped bracing system disclosed herein. In another preferred embodiment, the invention is a quadrilateral structure that incorporates a rotational lockdown component. In preferred embodiment, these quadrilateral structures incorporate one or more of the asymmetrical joint systems disclosed herein.

In a preferred embodiment, the invention is an interlocking shelf joint system for joining members at a right angle to one another (e.g., joining a horizontal shelf to a vertical support), said interlocking joint system comprising: a first member comprising an outer surface into which a mortise having a full depth is formed, said mortise being bounded by a first mortise-forming surface that is substantially perpendicular to said outer surface and that extends from said outer surface to the full depth of said mortise, a second mortise-forming surface that is substantially parallel to said outer surface at the full depth of said mortise, said first mortise-forming surface and said second mortise-forming surface intersecting at a first mortise corner, a third mortise-forming surface that is substantially perpendicular to said outer surface and that extends from said second mortise-forming surface toward said outer surface but does not reach said outer surface, said second mortise-forming surface and said third mortise-forming surface intersecting in a second mortise corner, a fourth mortise-forming surface that is substantially parallel to said outer surface and that extends toward said first mortise-forming surface but does not reach said first mortise surface, said third mortise-forming surface and said fourth mortise-forming surface intersecting in a third mortise corner, and a fifth mortise-forming surface that is substantially perpendicular to said outer surface and that extends to said outer surface, said fourth mortise-forming surface and said fifth mortise-forming surface intersecting in a fourth mortise corner, and; a second member comprising a tenon that is configured to fit tightly into said mortise.

In another preferred embodiment, the invention is an interlocking shelf joint system for joining members at right angles to one another, said interlocking joint system comprising: a first member comprising two substantially parallel outer surfaces and a tenon having a full depth and a full width, said tenon being bounded by a first tenon surface that is in the same plane as one of said outer surfaces and that extends the full depth of the tenon, a second tenon surface that is substantially perpendicular to said first tenon surface and that extends the full width of said tenon, said first tenon surface and said second tenon surface intersecting at a first tenon corner, a third tenon surface that is in the same plane as the other of said outer surfaces and that extends from said second tenon surface in the same plane as the other of said outer surfaces a distance that is less than the full depth of said tenon, said second tenon surface and said third tenon surface intersecting at a second tenon corner, a fourth tenon surface that is substantially perpendicular to said outer surfaces and that extends toward said first tenon surface less than the full width of said tenon, said third tenon surface and said fourth tenon surface intersecting at a third tenon corner, and a fifth tenon surface that extends from said fourth tenon surface substantially parallel to said outer surfaces, said fourth tenon surface and said fifth tenon surface intersecting at a fourth tenon corner; and a mortise into which said tenon fits.

In yet another preferred embodiment, the invention is a shelf joint system comprising: a first workpiece having a mortise formed by passing a T-slot cutter through the first workpiece to produce a T-shaped slot having overhanging edges and by passing a straight-slot cutter through the first workpiece to remove one of the overhanging edges; and a tenon formed by passing a straight-slot cutter through a second workpiece to produce an interlocking member shaped so as to slide tightly into said mortise.

In a further preferred embodiment, the invention is an interlocking shelf joint system comprising: a first piece having an asymmetrical mortise, said asymmetrical mortise being formed by a first cantilever that is a portion of said first piece; and a second piece having an asymmetrical tenon, said asymmetrical tenon being formed by a second cantilever that is a part of said second piece.

In another preferred embodiment, the invention is an interlocking flange joint system for joining members at right angles to one another (e.g., joining a horizontal flange-like plate to a vertical support), said interlocking joint system comprising: a first member comprising an outer surface into which a mortise having a full depth and a full width is formed, said mortise being bounded by a first mortise-forming surface that is substantially perpendicular to said outer surface and that extends from said outer surface to less than the full depth of said mortise, a second mortise-forming surface that is substantially parallel to said outer surface at less than the full depth of said mortise, said first mortise-forming surface and said second mortise-forming surface intersecting at a first mortise corner, a third mortise-forming surface that is substantially perpendicular to said outer surface and that extends from said second mortise-forming surface to the full depth of the mortise, said second mortise-forming surface and said third mortise-forming surface intersecting in a second mortise corner, a fourth mortise-forming surface that is substantially parallel to said outer surface and that extends across the full width of said mortise at the full depth of said mortise, said third mortise-forming surface and said fourth mortise-forming surface intersecting in a third mortise corner, and a fifth mortise-forming surface that is substantially perpendicular to said outer surface and that extends toward said outer surface but does not reach said outer surface, said fourth mortise-forming surface and said fifth mortise-forming surface intersecting in a fourth mortise corner, a sixth mortise-forming surface that is substantially parallel to said outer surface at less than the full depth of said mortise, said fifth mortise-forming surface and said sixth mortise-forming mortise surface intersecting at a fifth mortise corner, and a seventh mortise-forming surface that is substantially perpendicular to said outer surface and that extends from said sixth mortise-forming surface to said outer surface, said sixth mortise-forming surface and said seventh mortise-forming mortise surface intersecting at a six mortise corner and; a second member comprising a tenon that is configured to fit tightly into said mortise, but not to fill said mortise.

In another preferred embodiment, the invention is an interlocking joint system for joining members at right angles to one another, said interlocking joint system comprising: a first member comprising two substantially parallel outer surfaces and a tenon having a full depth and a full width, said tenon being bounded by a first tenon surface that is in the same plane as one of said outer surfaces and that extends the full depth of the tenon, a second tenon surface that is substantially perpendicular to said first tenon surface and that extends the full width of said tenon, said first tenon surface and said second tenon surface intersecting at a first tenon corner, a third tenon surface that is substantially parallel to said outer surfaces and that extends from said second tenon surface a distance that is less than the full depth of said tenon, said second tenon surface and said third tenon surface intersecting at a second tenon corner, a fourth tenon surface that is substantially perpendicular to said outer surfaces and that extends toward said first tenon surface less than the full width of said tenon, said third tenon surface and said fourth tenon surface intersecting at a third tenon corner, and a fifth tenon surface that extends from said fourth tenon surface substantially parallel to said outer surfaces, said fourth tenon surface and said fifth tenon surface intersecting at a fourth tenon corner; and a second member having a mortise into which said tenon fits but does not fill.

In yet another preferred embodiment, the invention is a flange joint system comprising: a first workpiece having a mortise formed by passing a T-slot cutter through the first workpiece to produce a T-shaped slot having two overhanging edges; and a tenon formed by passing a straight-slot cutter or one arm of a T-slot cutter through a second workpiece to produce an interlocking member shaped so as to be tightly slidable into a portion of said mortise.

In a further preferred embodiment, the invention is an interlocking flange joint system comprising: a first piece having a symmetrical mortise, said asymmetrical mortise being formed by a first cantilever and a second cantilever that are portions of said first piece; and a second piece having an asymmetrical tenon, said asymmetrical tenon being formed by a third cantilever that is a part of said second piece.

In another preferred embodiment, the invention is an interlocking flush joint system for joining members at a right angle to one another to form a right angle corner (e.g., a flush joint), said interlocking joint system comprising: a first member comprising a first outer surface and a second outer surface that intersect in a corner into which a mortise having a full depth and a full width is formed, said mortise being bounded by a first mortise-forming surface that is substantially parallel to said first outer surface and that extends from said second outer surface to less than the full width of said mortise, a second mortise-forming surface that is substantially perpendicular to said first outer surface and that extends from said first mortise-forming surface to the full depth of said mortise, said first mortise-forming surface and said second mortise-forming surface intersecting at a first mortise corner, a third mortise-forming surface that is substantially parallel to said first outer surface at the full depth of said mortise, said second mortise-forming surface and said third mortise-forming mortise surface intersecting at a second mortise corner, a fourth mortise-forming surface that is substantially parallel to said second outer surface and that extends from said third mortise-forming surface toward said first outer surface but does not reach said first outer surface, said third mortise-forming surface and said fourth mortise-forming surface intersecting in a third mortise corner, a fifth mortise-forming surface that is substantially parallel to said first outer surface and that extends toward the plane of said second mortise-forming surface but does not reach the plane of said second mortise surface, said fourth mortise-forming surface and said fifth mortise-forming surface intersecting in a fourth mortise corner, and a sixth mortise-forming surface that is substantially perpendicular to said first outer surface and that extends to said first outer surface, said fifth mortise-forming surface and said fourth mortise-forming surface intersecting in a fifth mortise corner and; a second member comprising a tenon that is configured to fit tightly into said mortise to produce the right angle corner.

In yet another preferred embodiment, the invention is an interlocking flush joint system for joining members at a right angle to one another to form a right angle corner, said interlocking joint system comprising: a first member comprising two substantially parallel outer surfaces and a tenon having a full depth and a full width, said tenon being bounded by a first tenon surface that is substantially perpendicular to said outer surfaces, a second tenon surface that is substantially parallel to said outer surfaces and that extends the full depth of the tenon, said first tenon surface and said second tenon surface intersecting in a first tenon corner, a third tenon surface that is substantially perpendicular to said second tenon surface and that extends the full width of said tenon, said second tenon surface and said third tenon surface intersecting at a second tenon corner, a fourth tenon surface that is in the same plane as one of said outer surfaces and that extends from said third tenon surface a distance that is less than the full depth of said tenon, said third tenon surface and said fourth tenon surface intersecting at a third tenon corner, a fifth tenon surface that is substantially perpendicular to said outer surfaces and that extends toward the plane said second tenon surface less than the full width of said tenon, said fourth tenon surface and said fifth tenon surface intersecting at a fourth tenon corner, and a sixth tenon surface that extends from said fifth tenon surface substantially parallel to said outer surfaces, said fifth tenon surface and said sixth tenon surface intersecting at a fifth tenon corner, and a seventh tenon surface that extends from said sixth tenon surface substantially perpendicular to said outer surfaces to the one of said outer surfaces, said sixth tenon surface and said seventh tenon surface intersecting at a sixth tenon corner; and a second member having a mortise into which said tenon fits.

In a further embodiment, the invention is a flush joint system comprising: a first workpiece having a mortise formed by passing a T-slot cutter through the first workpiece to produce a T-shaped slot having overhanging edges and by passing a straight-slot cutter through the first workpiece to remove one of the overhanging edges and form an abutment; and a tenon formed by passing a straight-slot cutter through a first surface and a second surface of a second workpiece to produce an interlocking member that has a notch and is shaped so as to be tightly slidable into said mortise.

In another preferred embodiment, the invention is an interlocking flush joint system comprising: a first piece having an asymmetrical mortise, said asymmetrical mortise being formed by a first cantilever that is a portion of said first piece and an abutment that is another portion of said first piece; and a second piece having an asymmetrical tenon, said asymmetrical tenon being formed by a second cantilever that is a part of said second piece and a notch into which said abutment is slidable.

In another preferred embodiment, the invention is a flush joint system comprising: an asymmetrically-shaped female component having a first set of dimensions; and an asymmetrically-shaped male component that interlocks with said female component, said asymmetrically-shaped male component having a second set of dimensions; wherein said asymmetrically-shaped female component has at least seven surfaces and said asymmetrically-shaped male component has at least seven connecting surfaces that contact said at least seven surfaces when the joint system is assembled. Preferably, said female component and said male components are fabricatable with a router that is capable of cutting a slot having the shape of a right prism. Preferably, said female component is fabricatable from a first workpiece having one thickness and said male component is fabricatable from a second workpiece having substantially the same thickness; and wherein said dimensions are a multiple of about one sixth or about one third of said same thickness. Preferably, each first dimension in said first set of dimensions and each second dimension in said second set of dimensions is substantially equal to two thirds, one third or one sixth of said thickness. Preferably, said female component and said male component making up a joint proper; and the female component makes up about half of the material within the joint proper and the male component makes up about half of the material within the joint proper.

In another preferred embodiment, the invention is a diamond-shaped bracing system, (e.g., for a quadrilateral, such as a bookshelf) that is capable of resisting lateral forces, said quadrilateral comprising: a frame (e.g., comprising a right side, a left side, a top plate and a bottom plate) having a left track, a right track and a groove; an upper backing piece having a first pair of backside tracks, said upper backing piece being slidably mountable in said left track, said right track and said groove; a middle backing piece having a second pair of backside tracks, said middle backing piece being slidably mountable in said left track and said right track and being interlockedable with said upper backing piece; a top left bracing piece that is slidably mountable in one of said first pair of backside tracks and in one of said second pair of backside tracks; a top right bracing piece that is slidably mountable in the other of said first pair of backside tracks and in the other of said second pair of backside tracks; a lower backing piece having a third pair of backside tracks, said lower backing piece being slidably mountable in said left track and said right track and being interlockedable with said middle backing piece; a bottom left bracing piece that is slidably mountable in one of said second pair of backside tracks and in one of said third pair of backside tracks; and a bottom right bracing piece that is slidably mountable in the other of said second pair of backside tracks and in the other of said third pair of backside tracks.

In yet another preferred embodiment, the invention is a joint system or interlocking structure for a quadrilateral, said joint system comprising: a bottom plate (e.g., first side) having two upper mortises in its upper surface and two lower mortises and a longitudinal groove on its bottom surface; a side kick left having a first front vertical groove, a first back vertical groove, a first horizontal groove and a first tenon that is slidably mountable in one of said lower mortises; a side kick right having a second front vertical groove, a second back vertical groove, a second horizontal groove and a second tenon that is slidably mountable in the other of said lower mortises; a front toe piece having a third horizontal groove, said front toe piece being slidably mountable in the first front vertical groove, the second front vertical groove and the longitudinal groove; a toe brace front piece that is slidably mountable in the first horizontal groove, the second horizontal groove and the third horizontal groove; a left (e.g., second) side having a left track, a left upper tenon and a left lower tenon that is slidably mountable (e.g., dovetailed) with one of said upper mortises; a right (e.g., second) side having a right track, a right upper tenon and a right lower tenon that is slidably mountable (e.g., dovetailed) with the other of said upper mortises; a top plate (e.g., fourth side) having a underside groove and two lower mortises that are slidably mountable (e.g., dovetailed) with the left upper tenon and the right upper tenon; an upper backing piece having a first pair of backside tracks, said upper backing piece being slidably mountable in said left track, said right track and said underside groove; an middle backing piece having a second pair of backside tracks, said middle backing piece being slidably mountable in said left track and said right track and being interlocked with said upper backing piece; a top left bracing piece that is slidably mountable in one of said first pair of backside tracks and in one of said second pair of backside tracks; a top right bracing piece that is slidably mountable in the other of said first pair of backside tracks and in the other of said second pair of backside tracks; a lower backing piece having a third pair of backside tracks, said lower backing piece being slidably mountable in said left track and said right track and being interlocked with said middle backing piece; a bottom left bracing piece that is slidably mountable in one of said second pair of backside tracks and in one of said third pair of backside tracks; a bottom right bracing piece that is slidably mountable in the other of said second pair of backside tracks and in the other of said third pair of backside tracks; a toe brace back piece that is slidably mountable the first vertical groove and the second vertical groove; a money piece having a horizontal track, said money piece being slidably mountable in the left back vertical groove and the right back vertical groove and being interlocked with said toe brace back piece, said lower backing piece, said bottom left bracing piece and said bottom right bracing piece.

In another preferred embodiment, the invention is a structure (e.g., a joint system for a quadrilateral) comprising: a top plate having an underside groove and two lower mortises; a bottom plate a longitudinal groove adjacent to its front edge and two bottom plate slots that extend part way through said bottom plate; a left side having a first front vertical groove, a first back vertical groove, a first horizontal groove, a left upper tenon that is slidably mountable in one of said lower mortises, and a left track; a right side having a second front vertical groove, a second back vertical groove, a second horizontal groove and a right upper tenon that is slidably mountable in the other of said lower mortises, and a right track; a front toe piece having a third horizontal groove, said front toe piece being slidably mountable in the first front vertical groove, the second front vertical groove and the longitudinal groove; a toe brace front piece that is slidably mountable in the first horizontal groove, the second horizontal groove and the third horizontal groove; a side left piece having at least one left horizontal groove, a left track, a left upper tenon and a left lower tenon that is slidably mountable (e.g., dovetailed) with one of said upper mortises; a side right piece having at least one right horizontal groove, a right track, a right upper tenon and a right lower tenon that is slidably mountable (e.g., dovetailed) with the other of said upper mortises; a top plate having a underside groove and two lower mortises that are slidably mountable (e.g., dovetailed) with the left upper tenon and the right upper tenon; at least one shelf that is slidably mountable in said left horizontal groove and in said right horizontal groove; an upper backing piece having a first pair of backside tracks, said upper backing piece being slidably mountable in said left track, said right track and said underside groove; an middle backing piece having a second pair of backside tracks, said middle backing piece being slidably mountable in said left track and said right track and being interlocked with said upper backing piece; a top left bracing piece that is slidably mountable in one of said first pair of backside tracks and in one of said second pair of backside tracks; a top right bracing piece that is slidably mountable in the other of said first pair of backside tracks and in the other of said second pair of backside tracks; a lower backing piece having a third pair of backside tracks, said lower backing piece being slidably mountable in said left track and said right track and being interlocked with said middle backing piece; a bottom left bracing piece that is slidably mountable in one of said second pair of backside tracks and in one of said third pair of backside tracks; a bottom right bracing piece that is slidably mountable in the other of said second pair of backside tracks and in the other of said third pair of backside tracks; a toe brace back piece that is slidably mountable in the first vertical groove and the second vertical groove; and a back toe piece having a horizontal track, said back toe piece being slidably mountable in the left back vertical groove and the right back vertical groove and being interlocked with said toe brace back piece, said lower backing piece, said bottom left bracing piece and said bottom right bracing piece. Preferably, each lower mortise and associated upper tenon comprise an interlocking flange joint system disclosed herein. Preferably, each lower mortise and associated upper tenon comprise an interlocking flange joint system disclosed herein.

In another preferred embodiment, the invention is a four-sided structure (e.g., a cube with flush edge joints) comprising: four side components, each of said side components being rectangular or square in overall shape having edges, two of said edges being substantially parallel; wherein the each of the substantially parallel edges of a first pair of said side components has an asymmetrical mortise, said asymmetrical mortise being formed by a first cantilever that is a portion of said first piece and an abutment that is another portion of said first piece; and wherein each of the substantially parallel edges of a second pair of said side components has an asymmetrical tenon, said asymmetrical tenon being formed by a second cantilever that is a part of said second piece and a notch into which said abutment is slidable.

In another preferred embodiment, the invention is a structure comprising: a top plate having an underside groove and two lower mortises; a bottom plate having a longitudinal groove adjacent to its front edge and two bottom plate slots that extend part of the way through said bottom plate; a left side having a first front vertical groove, a first back vertical groove, a first horizontal groove, a left upper tenon that is slidably mountable in one of said lower mortises, and a left track; a right side having a second front vertical groove, a second back vertical groove, a second horizontal groove and a right upper tenon that is slidably mountable in the other of said lower mortises, and a right track; a front toe piece having a third horizontal groove, said front toe piece being slidably mountable in the first front vertical groove, the second front vertical groove and the longitudinal groove; a toe brace front piece that is slidably mountable in the first horizontal groove, the second horizontal groove and the third horizontal groove; at least one shelf that is slidably mountable in said left horizontal groove and in said right horizontal groove; an upper backing piece having a first pair of backside tracks, said upper backing piece being slidably mountable in said left track, said right track and said underside groove; a middle backing piece having a second pair of backside tracks, said middle backing piece being slidably mountable in said left track and said right track and being interlocked with said upper backing piece; a top left bracing piece that is slidably mountable in one of said first pair of backside tracks and in one of said second pair of backside tracks; a top right bracing piece that is slidably mountable in the other of said first pair of backside tracks and in the other of said second pair of backside tracks; a lower backing piece having a third pair of backside tracks, said lower backing piece being slidably mountable in said left track and said right track and being interlocked with said middle backing piece; a bottom left bracing piece that is slidably mountable in one of said second pair of backside tracks and in one of said third pair of backside tracks; a bottom right bracing piece that is slidably mountable in the other of said second pair of backside tracks and in the other of said third pair of backside tracks; a toe brace back piece that is slidably mountable in the first vertical groove and the second vertical groove; a back toe piece having a horizontal track, said back toe piece being slidably mountable in the left back vertical groove and the right back vertical groove and being interlocked with said toe brace back piece, said lower backing piece, said bottom left bracing piece and said bottom right bracing piece. Preferably, each lower mortise and associated upper tenon comprise an interlocking flange joint system disclosed herein. Preferably, each horizontal groove is an asymmetrical mortise, said asymmetrical mortise being formed by a first cantilever that is a portion of said first piece; and each end of said shelf has an asymmetrical tenon, said asymmetrical tenon being formed by a second cantilever that is a part of said shelf.

In another preferred embodiment, the invention is a four-sided structure comprising: four side components, each of said side components being rectangular or square in overall shape having edges, two of said edges being substantially parallel; wherein the each of the substantially parallel edges of a first pair of said side components has an asymmetrical mortise, said asymmetrical mortise being formed by a first cantilever that is a portion of said first piece and an abutment that is another portion of said first piece; and wherein each of the substantially parallel edges of a second pair of said side components has an asymmetrical tenon, said asymmetrical tenon being formed by a second cantilever that is a part of said second piece and a notch into which said abutment is slidable. Preferably, each asymmetrical mortise and associated upper tenon comprise an interlocking flush joint system disclosed herein.

In yet another preferred embodiment, the invention is a four-sided structure (e.g. a cubical structure with mortise and tenon joints and a rotational lockdown component) comprising: a first pair of side components and a second pair of side components, each of said side components having edges, two of said edges being substantially parallel and a third of said edges being substantially perpendicular to said substantially parallel edges, each of said side components being provided with a ledge and a radial slot that are oriented substantially parallel to said third edge; wherein the each of the substantially parallel edges of said first pair of side components has one of a pair of tenons; wherein each of the substantially parallel edges of said second pair of side components has one of a pair of mortises; wherein one of said pairs of tenon slidably fits into one of said pair of mortises and another of said pairs of tenon slidably fits into another of said pair of mortises, making interlocking joints; a first backer component that rests on said ledge; and a first rotational lockdown component having radial tabs that fit into said radial slots when said rotational lockdown component is placed on said backer component and rotated about 45 degrees. Preferably, each of said interlocking joints comprises: a first piece having an asymmetrical mortise, said asymmetrical mortise being formed by a first cantilever that is a portion of said first piece and an abutment that is another portion of said first piece; and a second piece having an asymmetrical tenon, said asymmetrical tenon being formed by a second cantilever that is a part of said second piece and a notch into which said abutment is slidable. Preferably, each of said interlocking joints comprises: an asymmetrically-shaped female component having a first set of dimensions; and an asymmetrically-shaped male component that interlocks with said female component, said asymmetrically-shaped male component having a second set of dimensions; wherein said asymmetrically-shaped female component has at least seven surfaces and said asymmetrically-shaped male component has at least seven connecting surfaces that contact said at least seven surfaces when the joint system is assembled.

In another preferred embodiment, each of said side components is provided with a plurality of vertically-spaced radial slots, said four-sided structure further comprises: a plurality of backer components, with only said first backer component resting on said ledge; and a plurality of rotational lockdown components having radial tabs that fit into said plurality of vertically-spaced radial slots when each of said rotational lockdown components is placed on one of said backer components and rotated about 45 degrees. Preferably each of said side components is provided with two vertically-spaced radial slots and said four-sided structure further comprises: two backer components; and two rotational lockdown components.

In another preferred embodiment, each of said side components is provided with a plurality of vertically-spaced radial slots, said four-sided structure further comprises: a plurality of backer components, with only said first backer component resting on said ledge; and a plurality of rotational lockdown components having radial tabs that fit into said plurality of vertically-spaced radial slots when each of said rotational lockdown components is placed on one of said backer components and rotated about 45 degrees. Preferably each of said side components is provided with two vertically-spaced radial slots and said four-sided structure further comprises: two backer components; and two rotational lockdown components. Preferably, each of said side components is further provided with a plurality of horizontally-spaced radial slots, said four-sided structure further comprises: another plurality of rotational lockdown components having radial tabs that fit into said plurality of horizontally-spaced radial slots when each of said rotational lockdown components is placed on one of said backer components and rotated about 45 degrees. Preferably each of said side components is provided with a plurality of horizontally-spaced radial slots, said four-sided structure further comprises: a plurality of rotational lockdown components having radial tabs that fit into said plurality of horizontally-spaced radial slots when each of said rotational lockdown components is placed said backer components and rotated about 45 degrees. Preferably, pairs of rotational lockdown components are disposed adjacent to one another and wherein said pairs of rotational lockdown components have interlocking tab extensions. Preferably each of said side components is provided with two horizontally-spaced radial slots and said four-sided structure further comprises: two rotational lockdown components.

In another preferred embodiment, each of said side components is provided with at least one shelf mortise and said four-sided structure further comprises: at least one storage shelf having ends, each end comprising a storage shelf tenon. Preferably, each of said side components has an arch shape and said first rotational lockdown component is a round rotational lockdown that has an underside and undercuts that are operative to allow a user's hands to wrap around the underside of said first rotational lockdown and turn it like a steering wheel. Preferably, each of said side components has a width, a height and an outer surface, said height being substantially greater than said width and said first rotational lockdown component is a square rotational lockdown that has sides, an underside and square corners so that when rotation of said square rotational lockdown is complete said sides are flush with the outer surfaces of said side components and the underside of square rotational lockdown is not visible to a user.

In another embodiment, the invention is a method for making one or more of the components of one of the structures disclosed herein. In another embodiment, the invention is a method for assembling one of the structures disclosed herein.

Further aspects of the invention will become apparent from consideration of the drawings and the ensuing description of preferred embodiments of the invention. A person skilled in the art will realize that other embodiments of the invention are possible and that the details of the invention can be modified in a number of respects, all without departing from the concept. Thus, the following drawings and descriptions are to be regarded as illustrative in nature and not restrictive.

BRIEF DESCRIPTION OF THE SEVERAL VIEWS OF THE DRAWINGS

The features of the invention will be better understood by reference to the accompanying drawings which illustrate presently preferred embodiments of the invention. In the drawings:

FIG. 18 is a top perspective view of a preferred embodiment of the invention in a partially assembled state, showing a shelf and the symmetrical orientation of the corner joints.

FIG. 19 is an exploded view of a preferred stool embodiment of the invention.

FIG. 20 is a bottom perspective view of a round rotational lockdown component of a preferred embodiment of the invention.

FIG. 22 is a bottom perspective view of a square rotational lockdown component of a preferred embodiment of the invention.

Figure 2:
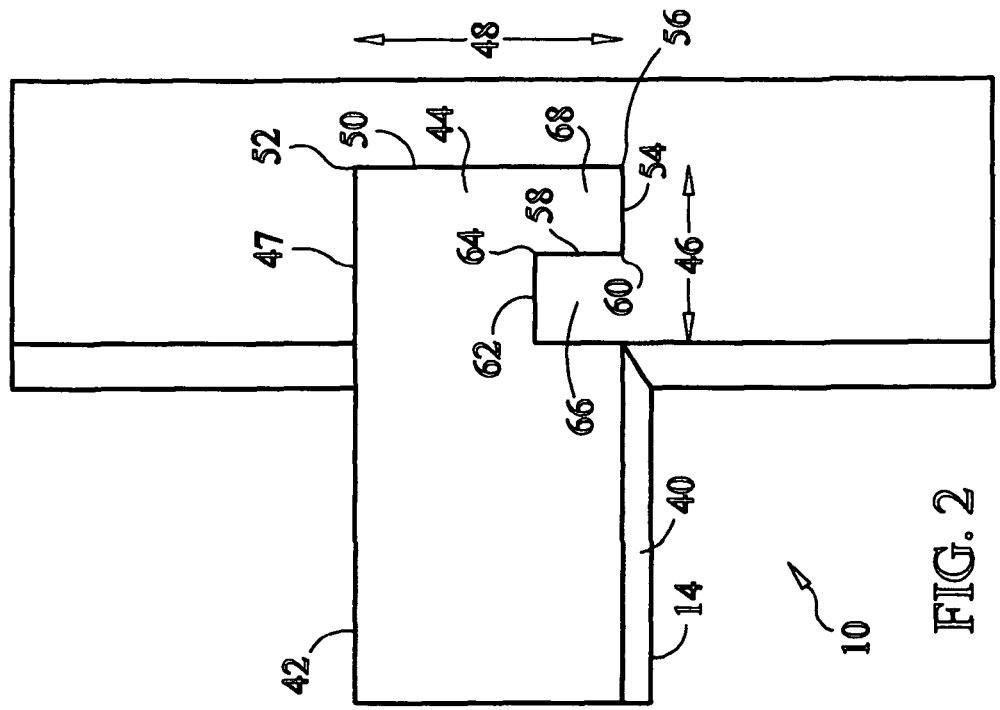
FIG. 2 is a perspective view of the tenon portion of a preferred embodiment of the shelf joint system of the present invention, shown assembled with the mortise portion for clarity.

The following reference numerals are used to indicate the parts and environment of the invention on the drawings:

| | |
|---|---|
| 10 | shelf joint system |
| 12 | support member |
| 13 | support member thickness |
| 14 | shelf member |
| 15 | shelf member thickness |
| 16 | support outer surface |
| 18 | mortise |
| 20 | mortise full depth |
| 21 | mortise full width |
| 22 | first mortise-forming surface |
| 24 | second mortise-forming surface |
| 26 | first mortise corner |
| 28 | third mortise-forming surface |
| 30 | second mortise corner |
| 32 | fourth mortise-forming surface |
| 34 | third mortise corner |
| 36 | fifth mortise-forming surface |
| 38 | fourth mortise corner |
| 40 | first shelf outer surface |
| 42 | second shelf outer surface |
| 44 | tenon |
| 47 | first tenon surface |
| 46 | tenon full depth |
| 48 | tenon full width |
| 50 | second tenon surface |
| 52 | first tenon corner |
| 54 | third tenon surface |

-continued

| | |
|---|---|
| 56 | second tenon corner |
| 58 | fourth tenon surface |
| 60 | third tenon corner |
| 62 | fifth tenon surface |
| 64 | fourth tenon corner |
| 66 | other overhanging edge, first cantilever |
| 68 | second cantilever |
| 80 | flange joint system |
| 82 | vertical member |
| 83 | vertical member thickness |
| 84 | flange member |
| 85 | flange member thickness |
| 86 | flange outer surface |
| 88 | flange mortise |
| 90 | full flange mortise depth |
| 92 | full flange mortise width |
| 94 | first flange mortise-forming surface |
| 96 | second flange mortise-forming surface |
| 98 | first flange mortise corner |
| 100 | third flange mortise-forming surface |
| 102 | second flange mortise corner |
| 103 | third flange mortis corner |
| 104 | fourth flange mortise-forming surface |
| 106 | fifth flange mortise-forming surface |
| 108 | fourth flange mortise corner |
| 110 | sixth flange mortise-forming surface |
| 112 | fifth flange mortise corner |
| 114 | seventh flange mortise-forming surface |
| 116 | sixth flange mortise corner |
| 120 | first vertical support outer surface |
| 122 | second vertical support outer surface |
| 124 | vertical tenon |
| 126 | first vertical tenon surface |
| 128 | full vertical tenon depth |
| 130 | second vertical tenon surface |
| 132 | full vertical tenon width |
| 136 | first vertical tenon corner |
| 138 | third vertical tenon surface |
| 140 | second vertical tenon corner |
| 142 | fourth vertical tenon surface |
| 144 | third vertical tenon corner |
| 146 | fifth vertical tenon surface |
| 148 | fourth vertical tenon corner |
| 150 | first flange mortise cantilever |
| 152 | second flange mortise cantilever |
| 154 | vertical tenon cantilever |
| 160 | flush joint system |
| 162 | first cube side, first member, first piece, first workpiece, female component |
| 163 | first side thickness |
| 164 | second cube side, second member, second piece, second workpiece, male component |
| 165 | second side thickness |
| 166 | first side end surface |
| 168 | first side outer surface |
| 170 | cube corner |
| 172 | flush mortise |
| 174 | full flush mortise depth |
| 176 | full flush mortise width |
| 178 | first flush mortise-forming surface |
| 180 | second flush mortise-forming surface |
| 182 | first flush mortise corner |
| 184 | third flush mortise-forming surface |
| 186 | second flush mortise corner |
| 188 | fourth flush mortise-forming surface |
| 190 | third flush mortise corner |
| 192 | fifth flush mortise-forming surface |
| 220 | fourth flush mortise corner |
| 222 | sixth flush mortise-forming surface |
| 224 | fifth flush mortise corner |
| 230 | flush tenon |
| 232 | inside surface |
| 234 | outside surface |
| 236 | full flush tenon depth |
| 238 | full flush tenon width |
| 240 | first flush tenon surface |
| 242 | second flush tenon surface |
| 244 | first flush tenon corner |
| 246 | third flush tenon surface |
| 248 | second flush tenon corner |

-continued

| | |
|---|---|
| 250 | fourth flush tenon surface |
| 252 | third flush tenon corner |
| 254 | fifth flush tenon surface |
| 256 | fifth flush tenon corner |
| 258 | sixth flush tenon surface |
| 260 | fourth flush tenon corner |
| 262 | seventh flush tenon surface |
| 264 | sixth flush tenon corner |
| 268 | flush mortise cantilever, first cantilever |
| 270 | abutment |
| 272 | flush tenon cantilever, second cantilever |
| 274 | notch |
| 280 | quadrilateral, bookshelf |
| 281 | left side cutout |
| 282 | left side |
| 283 | right side cutout |
| 285 | first front vertical groove |
| 287 | first back vertical groove |
| 288 | front toe kick |
| 290 | right side |
| 291 | first horizontal groove |
| 292 | bottom plate |
| 293 | bottom plate slots |
| 294 | top plate |
| 295 | second horizontal groove |
| 296 | upper backing piece |
| 297 | second back vertical groove |
| 298 | middle backing piece |
| 300 | top left bracing piece |
| 302 | top right bracing piece |
| 304 | lower backing piece |
| 306 | bottom left bracing piece |
| 308 | bottom right bracing piece |
| 309 | toe brace front piece |
| 310 | toe brace back piece |
| 312 | back toe kick |
| 313 | horizontal track |
| 314 | first shelf |
| 316 | second shelf |
| 317 | indents |
| 318 | protrusions |
| 320 | frame |
| 322 | shelf groove |
| 400 | cube structure |
| 402 | second pair of side components |
| 404 | first pair of side components |
| 406 | substantially parallel edges |
| 408 | third edge |
| 407 | backer component |
| 409 | cube mortises |
| 410 | cube tenons |
| 411 | rotational lockdown component |
| 412 | radial tabs |
| 420 | ledge |
| 422 | radial slots |
| 500 | storage structure |
| 502 | first pair of storage side components |
| 504 | second pair of storage side components |
| 550 | asymmetrical cube structure |
| 552 | first pair of asymmetrical side components |
| 554 | second pair of asymmetrical side components |
| 600 | shelf storage structure |
| 602 | top component |
| 604 | bottom component |
| 606 | slotted side components |
| 608 | back component |
| 610 | interlocking rotational lockdown component |
| 614 | interlocking grips |
| 616 | tab extension |
| 618 | storage shelf |
| 650 | stool structure |
| 652 | round rotational lockdown |
| 653 | undercuts |
| 654 | arches |
| 700 | pedestal structure |
| 702 | square rotational lockdown |
| 704 | pedestal sides |
| 706 | outer edges |

DETAILED DESCRIPTION OF THE INVENTION

A number of preferred embodiments of the invention are described herein. While these embodiments are illustrated preferred joint components as being bounded by planar surfaces and to have right-angle corners, preferred joint components in other embodiments are bounded by curved surfaces and/or other non-planar surfaces and/or have rounded corners and have corners that are not right angle corners. A person having ordinary skill in the art would realize that the only requirement is that each tenon must fit in each associated mortise. Thus, the embodiments presented herein should be regarded as illustrative only.

Figure 1:
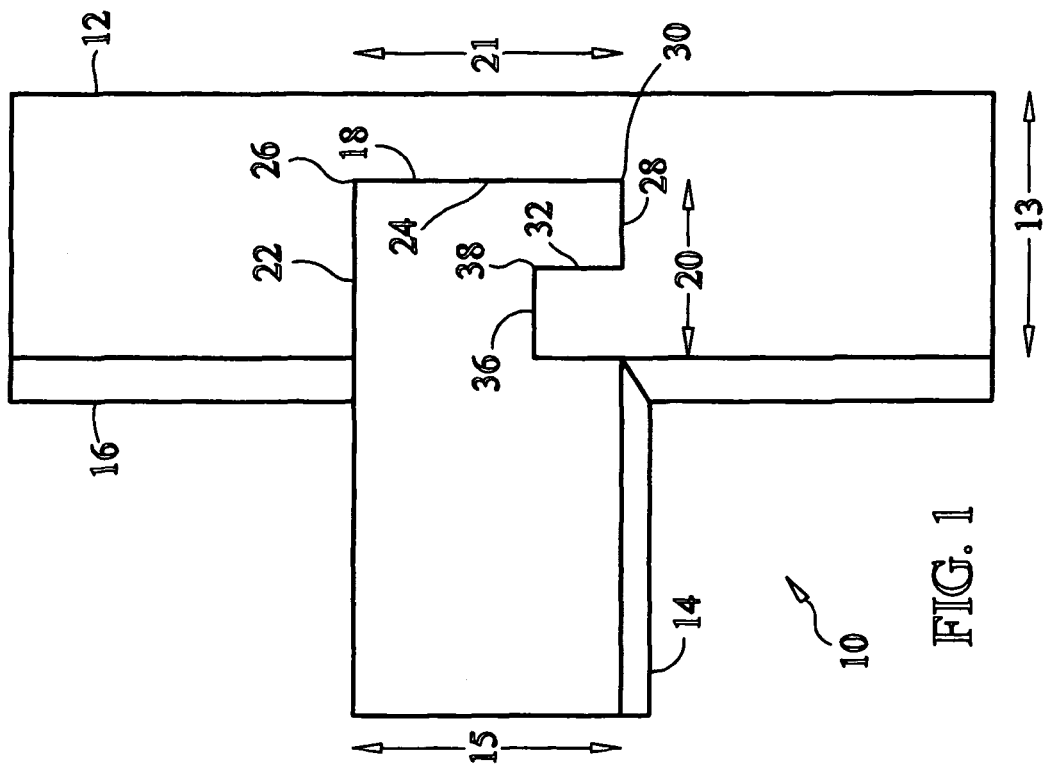
FIG. 1 is a perspective view of the mortise portion of a preferred embodiment of the shelf joint system of the present invention, shown assembled with the tenon portion for clarity.

Referring to FIG. 1, a preferred embodiment of shelf joint system 10 of the present invention is presented. In this drawing, the elements of mortise 18 are called out. In this embodiment, the invention is an interlocking joint system for joining members, preferably at right angles to one another. While this embodiment envisions joining a shelf to a support, joint system 10 can be used to join any two members. Shelf joint system 10 preferably comprises support member 12 and shelf member 14. Support member 12 preferably comprises support outer surface 16 into which mortise 18 having full depth 20 is formed. Mortise 18 is preferably bounded by first mortise-forming surface 22 that is substantially perpendicular to support outer surface 16 and that extends a distance from support outer surface 16 to the full depth 20 of mortise 18. This distance is preferably equal to about two thirds of support member thickness 13. Mortise 18 is preferably also bounded by second mortise-forming surface 24 that is substantially parallel to support outer surface 16 at full depth 20 of mortise 18. First mortise-forming surface 22 and second mortise-forming surface 24 preferably intersect at first mortise corner 26. Mortise 18 is preferably also bounded by third mortise-forming surface 28 that is substantially perpendicular to support outer surface 16 and extends from second mortise-forming surface 24 toward support outer surface 16 but does not reach support outer surface 16. Second mortise-forming surface 24 and third mortise-forming surface 28 preferably intersect in second mortise corner 30. Mortise 20 is preferably also bounded by fourth mortise-forming surface 32 that is substantially parallel to support outer surface 16 and extends a distance toward first mortise-forming surface 22 but does not reach first mortise surface 22. This distance is preferably equal to about one third of shelf member thickness 15. Third mortise-forming surface 28 and fourth mortise-forming surface 32 preferably intersect in third mortise corner 34. Mortise 18 is preferably also bounded by fifth mortise-forming surface 36 that is substantially perpendicular to support outer surface 16 and extends to support outer surface 16. Fourth mortise-forming surface 32 and fifth mortise-forming surface 36 preferably intersect in fourth mortise corner 38. In a preferred embodiment, the mortise corners are square, but in an alternative embodiment they are rounded.

Referring to FIG. 2, shelf member 14 preferably comprises two substantially parallel outer surfaces 40 and 42 and tenon 44 that is preferably configured to fit (preferably tightly) into mortise 18. In this drawing, the elements of tenon 44 are called out. Tenon 44 has full depth 46 and full width 48. Tenon 44 is preferably bounded by first tenon surface 47 that is in the same plane as second outer surface 42 and extends to full depth 46. Tenon 44 is preferably also bounded by second tenon surface 50 that is substantially perpendicular to first tenon surface 47 and extends to full width 48. First tenon surface 47 and second tenon surface 50 preferably intersect at first tenon corner 52. Tenon 44 is preferably also bounded by third tenon surface 54 that is in the same plane as the first shelf outer surface 40 and extends from second tenon surface 50 a distance that is less than full depth 46. Preferably, this distance is about one half of full depth 46 and about one third of support member thickness 13. Second tenon surface 50 and third tenon surface 54 preferably intersect at second tenon corner 56. Tenon 44 is preferably also bounded by fourth tenon surface 58 that is substantially perpendicular to the shelf outer surfaces and that extends toward first tenon surface 47 less than full width 48. Third tenon surface 54 and fourth tenon surface 58 preferably intersect at third tenon corner 60. Tenon 44 is preferably also bounded by fifth tenon surface 62 that extends from fourth tenon surface 58 substantially parallel to surfaces 42 and 54. Fourth tenon surface 58 and fifth tenon surface 62 preferably intersect at fourth tenon corner 64.

Referring to FIGS. 1 and 2, yet another preferred embodiment of shelf joint system 10 comprises support member 12 having mortise 18 and tenon 44. Mortise 18 is formed in support member 12 by passing a T-slot cutter through support member 12 to produce a T-shaped slot having overhanging edges. Then straight-slot cutter is passed through support member 12 to remove one overhanging edge and leave other overhanging edge 66. Tenon 44 is formed by passing a straight-slot cutter through shelf member 12 to produce interlocking member 44 shaped so as to slide (preferably tightly) into mortise 18.

Referring to FIGS. 1 and 2, a further preferred embodiment of shelf joint system 10 comprises support member 12 having asymmetrical mortise 18 and shelf member 12 having asymmetric tenon 44. Asymmetrical mortise 12 is formed by first cantilever 66 that is a portion of support member 12. Asymmetrical tenon 44 is formed by second cantilever 68 that is a part of shelf member 12.

Figure 3:
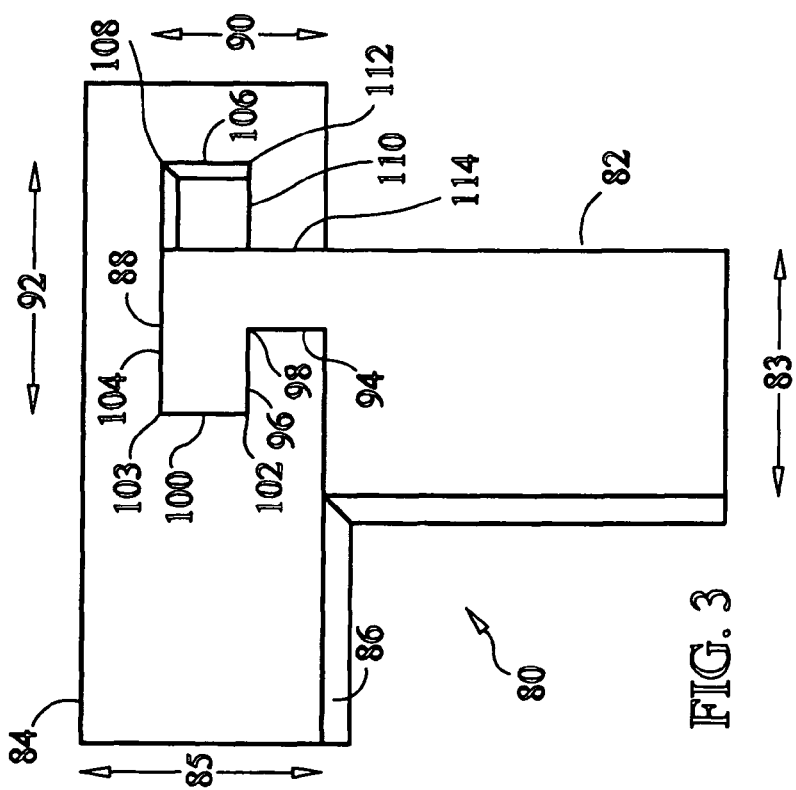
FIG. 3 is a perspective view of the mortise portion of the flange joint system of a preferred embodiment of the present invention, shown assembled with the tenon portion for clarity.

Referring to FIG. 3, a preferred embodiment of flange joint system 80 of the present invention is presented. In this drawing, the elements of flange mortise 88 are called out. In this embodiment, the invention is an interlocking joint system for joining members, preferably at right angles to one another. While this embodiment envisions joining a flange to a vertical member, joint system 80 can be used to join any two members. Flange joint system 80 preferably comprises vertical member 82 and flange member 84. Flange member 84 preferably comprises flange outer surface 86 into which flange mortise 88 having full flange mortise depth 90 and full flange mortise width 92 is formed. Flange mortise 88 is preferably bounded by first flange mortise-forming surface 94 that is substantially perpendicular to flange outer surface 86 and extends from flange outer surface 86 a distance that is less than full flange mortise depth 90. Preferably, this distance is about one half of full flange mortise depth 90 and about one third of flange member thickness 85. Flange mortise 88 is preferably also bounded by second flange mortise-forming surface 96 that is substantially parallel to flange outer surface 86 and extends a distance that is less than full flange mortise depth 90. Preferably, this distance is about one third of full flange mortise width 92 and about one third of vertical member thickness 83. First flange mortise-forming surface 94 and second flange mortise-forming surface 96 preferably intersect at first flange mortise corner 98. Flange mortise 88 is preferably also bounded by third flange mortise-forming surface 100 that is substantially perpendicular to said outer flange surface 86 and that extends from second flange mortise-forming surface 96 to full flange mortise depth 90. Preferably, third flange mortise-forming surface 100 extends a distance that is about one third of flange member thickness 85. Second flange mortise-forming surface 96 and third flange mortise-forming surface 100 preferably intersect in second flange mortise corner 102. Flange mortise 88 is preferably also bounded by fourth flange mortise-forming surface 104 that is substantially parallel to flange outer surface 86 and extends across full flange mortise width 92 at full flange mortise depth 90. Third flange mortise-forming surface 100 and fourth flange mortise-forming surface 104 preferably intersect in third flange mortise corner 103. Flange mortise 88 is preferably also bounded by fifth flange mortise-forming surface 106 that is substantially perpendicular to flange outer surface 86 and that extends toward flange outer surface 86 but does not reach it. Preferably, fifth flange mortise-forming surface 106 extends a distance that is about one third of flange member thickness 85. Fourth flange mortise-forming surface 104 and fifth flange mortise-forming surface 106 preferably intersect in fourth mortise corner 108. Flange mortise 88 is preferably also bounded by sixth flange mortise-forming surface 110 that is substantially parallel to flange outer surface 88 at less than full flange mortise depth 90. Fifth flange mortise-forming surface 106 and sixth flange mortise-forming surface 110 preferably intersect at fifth mortise corner 112. Flange mortise 88 is preferably also bounded by seventh flange mortise-forming surface 114 that is substantially perpendicular to outer flange surface 86 and that extends from sixth flange mortise-forming surface 110 to outer flange surface 86. Sixth flange mortise-forming surface 110 and seventh flange mortise-forming surface 114 preferably intersect at six mortise corner 116.

Figure 4:
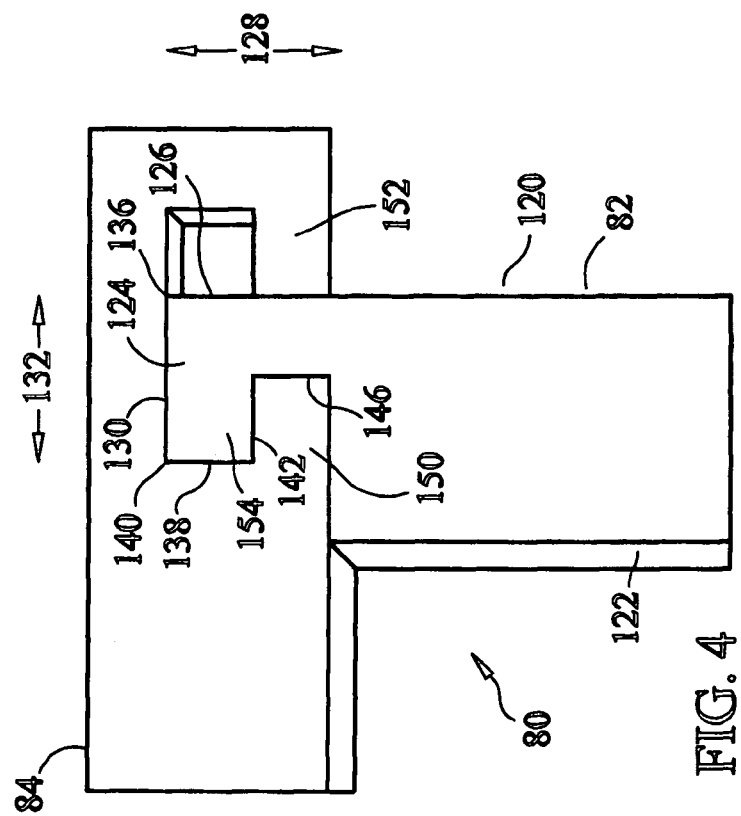
FIG. 4 is a perspective view of the tenon portion of a preferred embodiment of the flange joint system of the present invention, shown assembled with the mortise portion for clarity.

Referring to FIG. 4, vertical member 82 preferably comprises two substantially parallel outer surfaces 100 and 122 and vertical tenon 124 that is configured to fit (preferably tightly) into flange mortise 88 but not to fill flange mortise 88. In this drawing, the elements of vertical tenon 124 are called out. Vertical tenon 124 is preferably bounded by first vertical tenon surface 126 that is in the same plane as first vertical support outer surface 120 and that extends full vertical tenon depth 128. Full tenon depth 128 is preferably about two thirds of flange member thickness 85. Vertical tenon 124 is preferably also bounded by second vertical tenon surface 130 that is substantially perpendicular to said first vertical tenon surface 126 and that extends a distance is approximately equal to full vertical tenon width 132, which width is preferably approximately equal to two thirds of vertical member thickness 83. First vertical tenon surface 126 and second vertical tenon surface 130 preferably intersect at first vertical tenon corner 136. Vertical tenon 124 is preferably also bounded by third vertical tenon surface 138 that is substantially parallel to the vertical support outer surfaces and that extends from second vertical tenon surface 130 a distance that is less than full vertical tenon depth 128. Preferably, this distance is about one third of flange member thickness 85. Second vertical tenon surface 130 and third vertical tenon surface 138 preferably intersect at second vertical tenon corner 140. Vertical tenon 124 is preferably also bounded by fourth vertical tenon surface 142 that is substantially perpendicular to the vertical support outer surfaces and that extends a distance toward first vertical tenon surface 126 that is less than full vertical tenon width 132. Preferably, this distance is about one half of full vertical tenon width 132 and one third of vertical member thickness 83. Third vertical tenon surface 138 and fourth vertical tenon surface 142 preferably intersect at third vertical tenon corner 144. Vertical tenon 126 is preferably also bounded by fifth vertical tenon surface 146 that extends from fourth vertical tenon surface 142 substantially parallel to the vertical support outer surfaces. Fourth vertical tenon surface 142 and fifth vertical tenon surface 146 preferably intersect at fourth vertical tenon corner 148.

Referring to FIGS. 3 and 4, yet another preferred embodiment of flange joint system 80 comprises flange member 84 having flange mortise 88 formed therein and vertical tenon 124. Flange mortise 88 is preferably formed by passing a T-slot cutter through flange member 82 to produce a T-shaped slot having two overhanging edges. Vertical tenon 124 is formed by passing a straight-slot cutter or one arm of a T-slot cutter through vertical member 82 to produce an interlocking member shaped so as to be slidable (preferably tightly slidable) into a portion of flange mortise 88.

Referring to FIGS. 3 and 4, a further preferred embodiment of flange joint system 80 comprises flange member 84 having asymmetrical flange mortise 88 and vertical tenon 124. Asymmetrical flange mortise 88 is formed by first flange mortise cantilever 150 and second flange mortise cantilever 152 that are portions of flange member 84. Vertical member 84 comprises asymmetrical vertical tenon 124 which is formed by vertical tenon cantilever 154 that is a part of vertical support 84.

Figure 5:
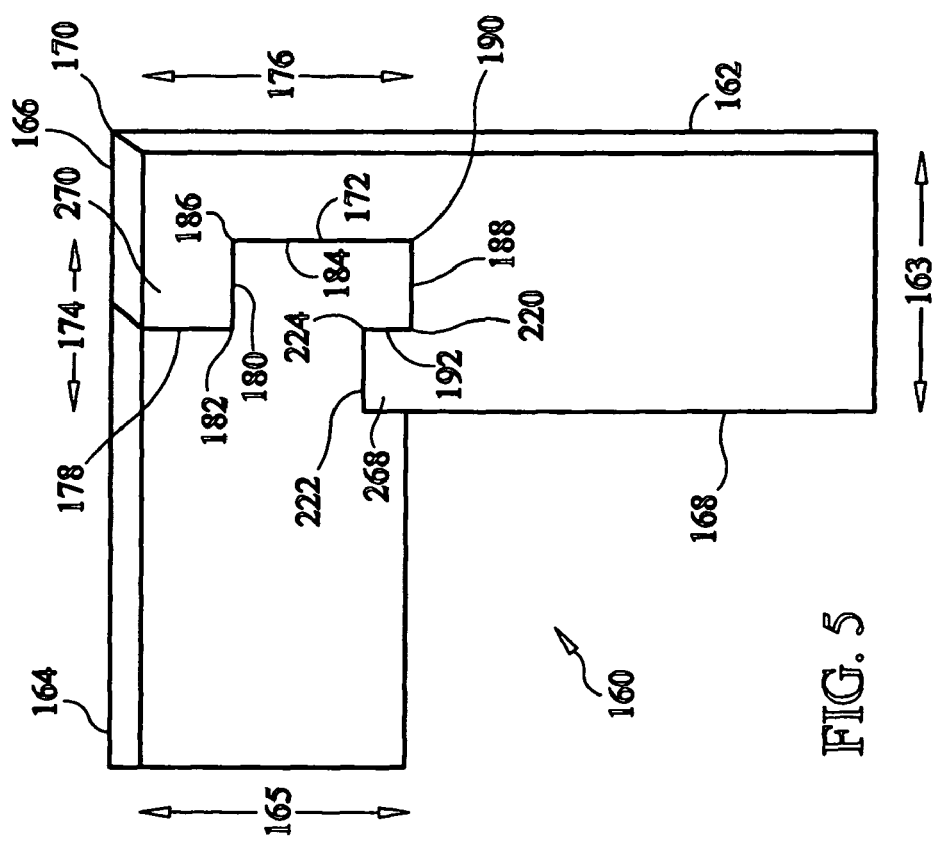
FIG. 5 is a perspective view of mortise portion of a preferred embodiment of the flush joint system of the present invention, shown assembled with the tenon portion for clarity.

Referring to FIG. 5, a preferred embodiment of flush joint system 160 of the present invention is presented. In this drawing, the elements of flush mortise 172 are called out. In this embodiment, the invention is an interlocking joint system for joining sides, members or pieces, preferably at right angles to one another. While this embodiment envisions joining a first side, first member or first piece 162 to a second side, second member or second piece 164 (e.g., of a cube), flush joint system 160 can be used to join any two members. Flush joint system 160 preferably comprises first side, first member or first piece 162 comprising first side outer surface (168) and first side end surface 166 and a second outer surface that intersect in cube corner 170 into which flush mortise 172 having full flush mortise depth 174 and full flush mortise width 176 is formed. Flush mortise 172 is preferably bounded by first flush mortise-forming surface 178 that is substantially parallel to first side outer surface 168 and that extends a distance from said first side end surface 166 that is less than full mortise width 176. Preferably, this distance is about one third of second side thickness 165. Flush mortise 172 is preferably also bounded by second flush mortise-forming surface 180 that is substantially perpendicular to first side outer surface 168 and that extends a distance from first flush mortise-forming surface 178 to full flush mortise depth 174. Preferably, this distance is approximately equal to one third first side thickness 163. First flush mortise-forming surface 178 and second flush mortise-forming surface 180 preferably intersect at first flush mortise corner 182. Flush mortise 172 is preferably also bounded by third flush mortise-forming surface 184 that is substantially parallel to second outer surface and first side outer surface 168 at full flush mortise depth 174. Preferably, full flush mortise depth 174 is approximately equal to two thirds of first side thickness 165 and full flush mortise depth 176 is approximately equal to second side thickness 165. Second flush mortise-forming surface 180 and third flush mortise-forming surface 184 preferably intersect at second flush mortise corner 186. Flush mortise 172 is preferably also bounded by fourth flush mortise-forming surface 188 that is substantially parallel to first side end surface 166 and that extends from third flush mortise-forming surface 184 a distance toward first side outer surface 168 but does not reach it. Preferably, this distance is approximately equal to one third of first side thickness 163. Third flush mortise-forming surface 184 and fourth flush mortise-forming surface 188 preferably intersect at third flush mortise corner 190. Flush mortise 172 is preferably also bounded by fifth flush mortise-forming surface 192 that is substantially parallel to first side outer surface 168 and that extends a distance toward the plane of second flush mortise-forming surface 180 but does not reach it. Preferably, this distance is equal to about one sixth of second side thickness 165. Fourth flush mortise-forming surface 188 and fifth flush mortise-forming surface 192 preferably intersect in fourth flush mortise corner 220. Flush mortise 172 is preferably also bounded by sixth mortise-forming surface 222 that is substantially perpendicular to first side outer surface 168 and that extends a distance to first side outer surface 168. Preferably, this distance is approximately equal to one third of first side thickness 163. Fifth flush mortise-forming surface 200 and sixth flush mortise-forming surface 222 preferably intersect in fifth flush mortise corner 224.

Figure 6:
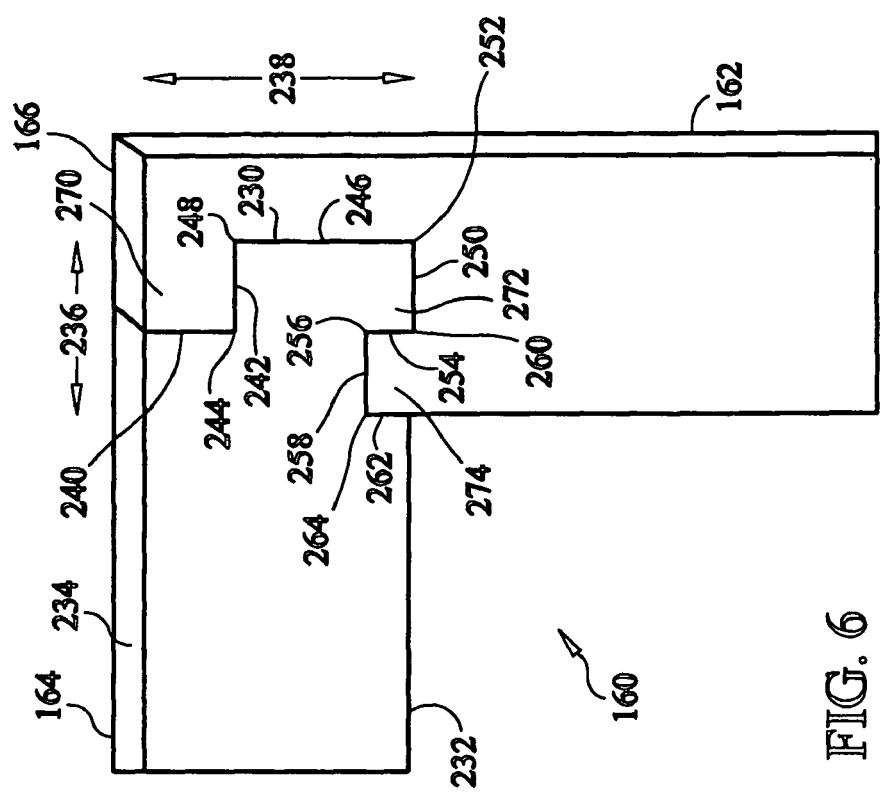
FIG. 6 is a perspective view of the tenon portion of a preferred embodiment of the flush joint system of the present invention, shown assembled with the mortise portion for clarity.

Referring to FIG. 6, second cube side 164 comprises flush tenon 230 that is configured to fit tightly into flush mortise 172 to produce right angle corner 170. In this drawing, the elements of flush tenon 230 are called out. Second cube side 164 comprises two substantially parallel outer surfaces, inside surface 232 and outside surface 234, with flush tenon 230 having full flush tenon depth 236 and full flush tenon width 238. Preferably, full flush tenon depth 236 is approximately equal to two thirds of first side thickness 163 and full flush tenon width 238 is approximately equal to second side thickness 165. Flush tenon 230 is preferably bounded by first flush tenon surface 240 that is substantially perpendicular to inside surface 232 and outside surface 234 and second flush tenon surface 242 that is substantially parallel to inside surface 232 and outside surface 234 and that extends a distance to full flush tenon depth 236. Preferably, this distance is approximately equal to one third of first side thickness 163. First flush tenon surface 240 and second flush tenon surface 242 preferably intersect in first flush tenon corner 244. Flush tenon 230 is preferably also bounded by third flush tenon surface 246 that is substantially perpendicular to second flush tenon surface 242 and that extends a distance to full flush tenon width 238. Preferably, this distance is approximately equal to two thirds of second side thickness 165. Second flush tenon surface 242 and third flush tenon surface 246 preferably intersect at second flush tenon corner 248. Flush tenon 230 is preferably also bounded by fourth flush tenon surface 250 that is in the same plane as inside surface 232 and that extends from third flush tenon surface 246 a distance that is less than full flush tenon depth 236. Preferably, this distance is equal to about one third of first side thickness 163. Third flush tenon surface 246 and fourth flush tenon surface 250 preferably intersect at third flush tenon corner 252. Flush tenon 230 is preferably also bounded by fifth flush tenon surface 254 that is substantially perpendicular to outer surfaces 232 and 234 and that extends a distance toward the plane of second flush tenon surface 242 less than full flush tenon width 238. Preferably, this distance is equal to about one sixth of second side thickness 165. Fourth flush tenon surface 250 and fifth flush tenon surface 254 preferably intersect at fourth flush tenon corner 260. Flush tenon 230 is preferably also bounded by sixth flush tenon surface 258 that extends a distance from fifth flush tenon surface 254 substantially parallel to outer surfaces 232 and 234. Preferably, this distance is equal to about one third of first side thickness 163. Fifth flush tenon surface 254 and sixth flush tenon surface 258 preferably intersect at fifth flush tenon corner 256. Flush tenon 230 is preferably also bounded by seventh flush tenon surface 262 that extends a distance from sixth flush tenon surface 258 substantially perpendicular to outer surfaces 232 and 234 to the outer surface 232. Preferably, this distance is equal to about one sixth of second side thickness 165. Sixth flush tenon surface 258 and seventh flush tenon surface 262 preferably intersect at sixth flush tenon corner 264.

Referring to FIGS. 5 and 6, in a further embodiment, flush joint system 160 comprises first side 162 having flush mortise 172 and flush tenon 230. Flush mortise 172 is preferably formed by passing a T-slot cutter through the first side 162 to produce a T-shaped slot having overhanging edges and by passing a straight-slot cutter through the first side 162 or sawing first side 162 to remove one of the overhanging edges and to leave flush mortise cantilever 268. Flush tenon 230 is preferably formed by passing a straight-slot cutter through first surface 232 to produce notch 274 and by passing the straight-slot cutter through second surface 234 of second side 164 to produce an interlocking member shaped so as to be slidable (preferably tightly slidable) into flush mortise 172.

Referring to FIGS. 5 and 6, in another preferred embodiment, interlocking flush joint system 160 preferably comprises first side 162 having asymmetrical flush mortise 172 and second side 164 having flush tenon 230. Asymmetrical flush mortise 172 is preferably formed by flush mortise cantilever 268 that is a portion of first side 162 and abutment 270 that is another portion of first side 162. Second side 164 preferably has asymmetrical flush tenon 230 which is formed by flush tenon cantilever 272 that is a part of second side 164 and notch 274 into which flush mortise cantilever 268 is slidable.

The embodiment of flush joint 160 shown in FIGS. 5 and 6 is preferred because the volume that portion of second cube side 164 (in this case, the volume of tenon 246) that is disposed within flush joint 160 proper is approximately equal to that volume of the portion of first cube side 162 that is disposed within flush joint 160 proper (which volume does not include the volume of flush mortise 172). In this disclosure, the term "flush joint proper" means that portion of first cube side 162 lying above a plane drawn through fourth flush mortise-forming surface 188 (see FIG. 5) plus that portion of second cube side 164 lying to the right of a plane drawn through first side outer surface 168 (see FIG. 5). In the embodiment shown in FIGS. 5 and 6, the flush joint proper takes the form of a square, right prism having a depth equal to the depth of the material of the cube sides. If one were to lay a two-dimensional square grid having cell dimensions equal to one sixth of first side thickness 163 and second side thickness 165 over the flush joint proper, it would divide the joint proper into 36 smaller, square, right prisms. Eighteen of these smaller, square, right prisms would make up the volume that portion of second cube side 164 (in this case, the volume of tenon 246) that is disposed within the flush joint proper and another eighteen of these smaller, square, right prisms would make up the volume of the portion of first cube side 162 that is disposed within the flush joint proper. From this perspective, the material of each of the members joined by flush joint system 160 (i.e. the volume of the male component of the joint or the volume of the female component of the joint) that is within the flush joint proper can be considered to comprise about half of the material within the flush joint proper. By conforming to these proportions (50:50 or 1:1), the applicant's joints are stronger than those of the background art.

Referring to FIGS. 5 and 6, flush joint system 160 comprises: an asymmetrically-shaped female component (e.g., that portion of first cube side lying above a plane drawn through fourth flush mortise-forming surface 188 in FIG. 5) having a first set of dimensions; and an asymmetrically-shaped male component (e.g., flush tenon 230) that interlocks with said female component, said asymmetrically-shaped male component having a second set of dimensions; wherein said asymmetrically-shaped female component has at least seven surfaces and said asymmetrically-shaped male component has at least seven connecting surfaces that contact said at least seven surfaces when the joint system is assembled. Preferably, said female component and said male components are fabricatable with a router that is capable of cutting a slot having a shape made up of one or more right prisms. Preferably, said female component is fabricatable from a first workpiece having one thickness and said male component is fabricatable from a second workpiece having substantially the same thickness. Preferably, each of said first set of dimensions and each of said second set of dimensions are substantially equal to one-third or one-sixth of said thickness. Preferably, the female component makes up about half of the material (or area) within the joint proper and the make component makes up about half of the material (or area) within the joint proper.

Figure 7:
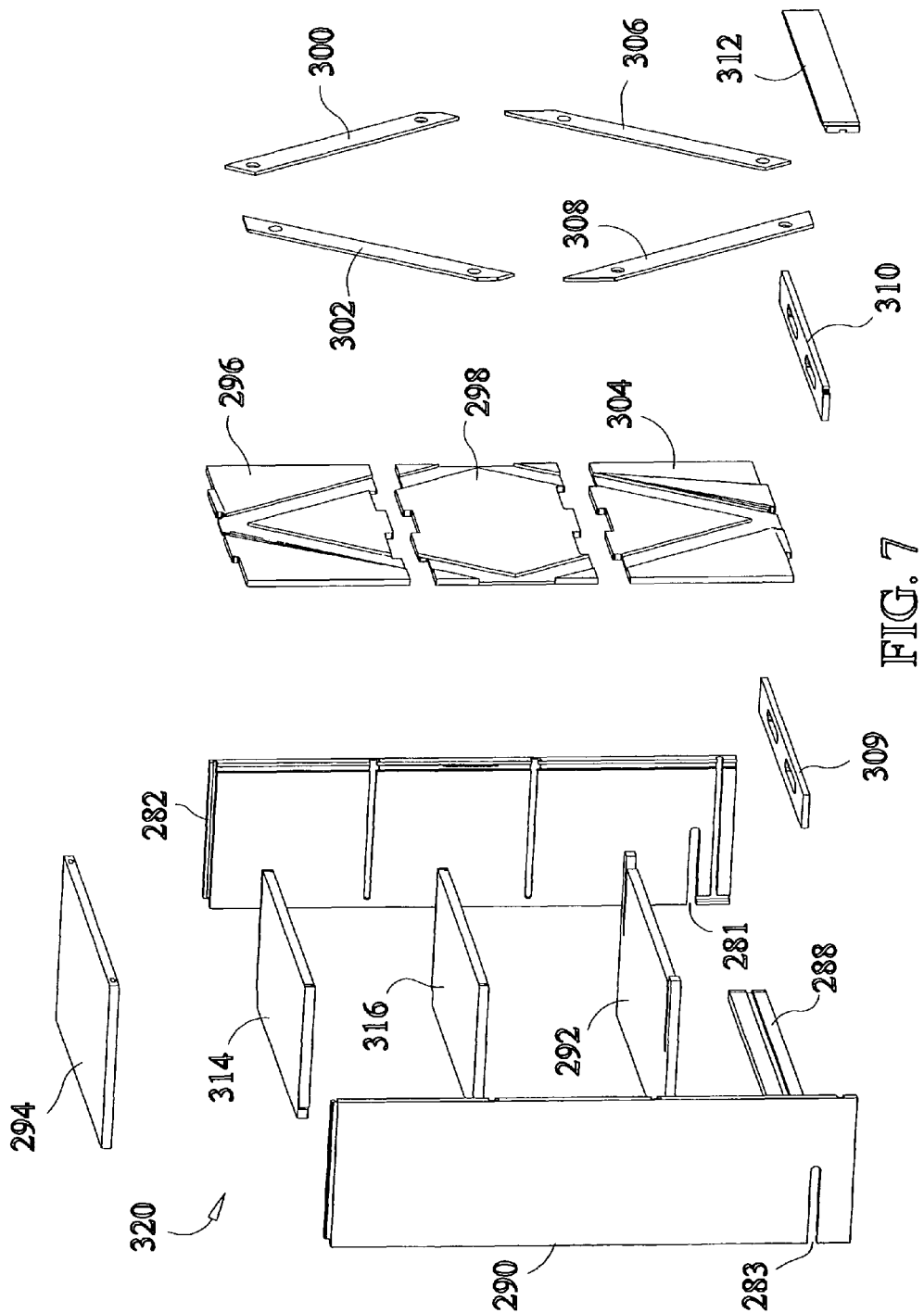
FIG. 7 is an exploded view of a preferred embodiment of a bookcase that incorporates aspects of the invention.

Preferred embodiments of the invention include structures that incorporate one or more of the interlocking structures disclosed herein. Referring to FIG. 7, a preferred embodiment of a bookcase that incorporates aspects of the invention is presented. In this embodiment, the invention is a quadrilateral (four-sided object) that is capable of resisting lateral forces. Quadrilateral or frame 280 comprises left side 282; front toe piece 288; right side 290; bottom plate 292; top plate 294; upper backing piece 296; middle backing piece 298; top left bracing piece 300; top right bracing piece 302; lower backing piece 304; bottom left bracing piece 306; bottom right bracing piece 308; toe brace back piece 310; and back toe piece 312.

Figure 8:
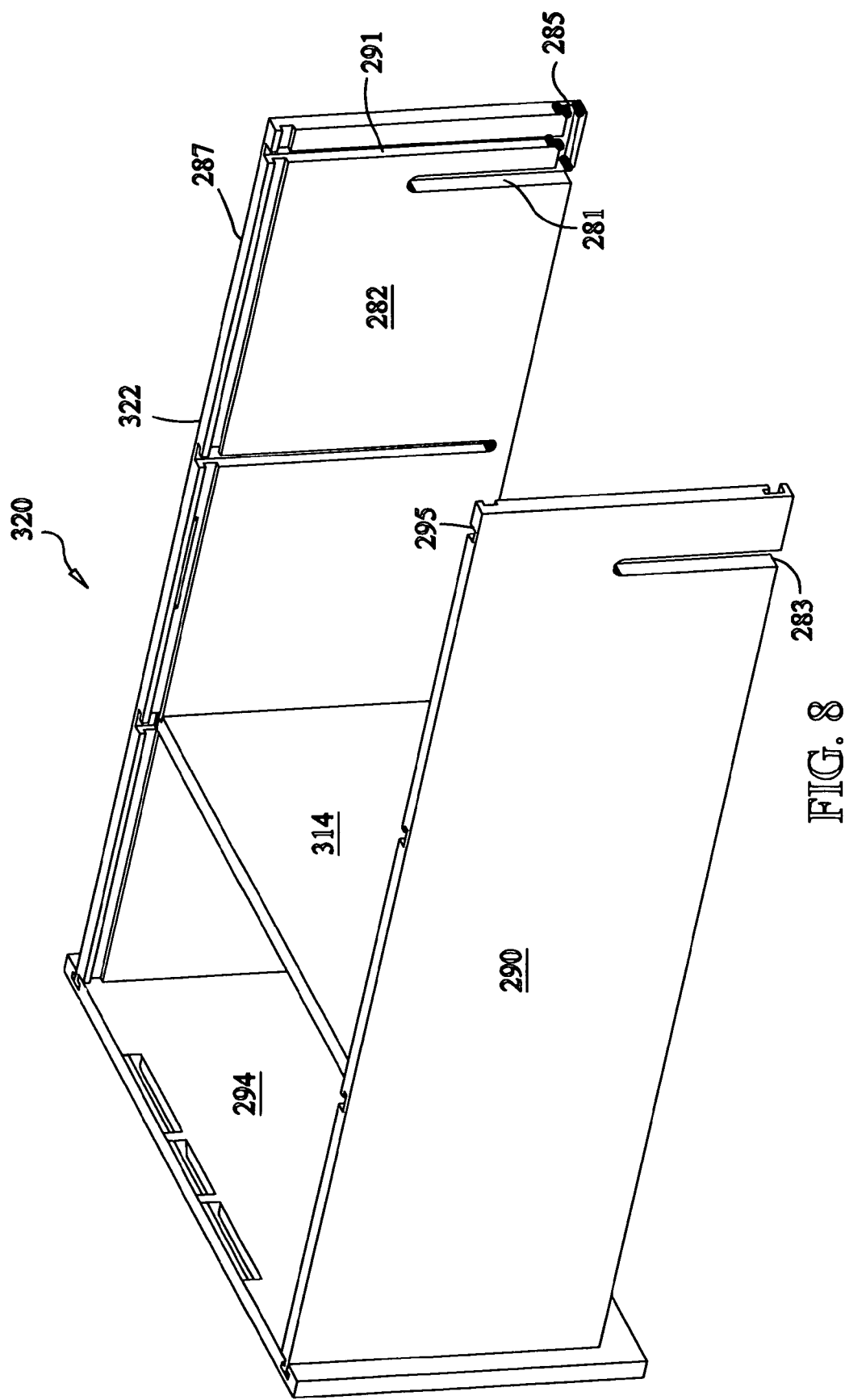
FIG. 8 is a perspective view of a preferred embodiment of the invention in a partially assembled state, lying on its front side.

Bottom plate 292 has two bottom plate slots 293 that extend part of the way through the plate and a longitudinal groove. As illustrated in FIG. 8, left side 282 has left side cutout 281, first front vertical groove 285 and first horizontal groove. Right side 290 has right side cutout 283, a second front vertical groove and a second horizontal groove. Top plate 294 has an underside groove and two lower mortises that are slidably mountable (e.g., flange jointed) with the left upper tenon of left side 282 and the right upper tenon of right side 290.

Figure 9:
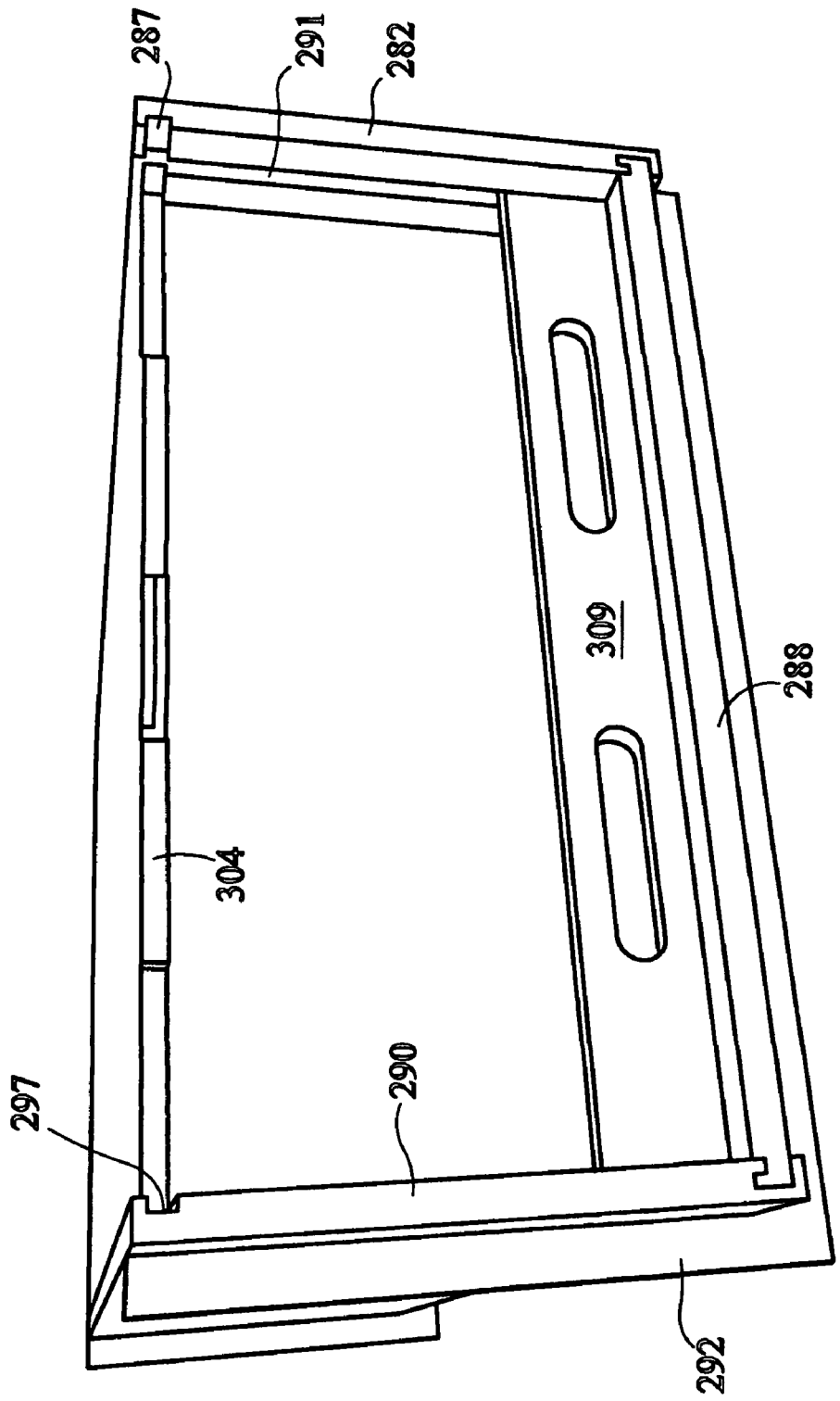
FIG. 9 is a bottom perspective view of a preferred embodiment of the invention in a partially assembled state.

Referring to FIG. 9, front toe piece 288 has a third horizontal groove, the front toe piece being slidably mountable in the first front vertical groove of left side 282, the second front vertical groove of right side 290 and the longitudinal groove in bottom plate 292. Front toe brace 309 is slidably mountable in the first horizontal groove of left side 282, the second horizontal groove of right side 290 and the third horizontal groove of front toe piece 288.

Upper backing piece 296 has a first pair of backside tracks, said upper backing piece being slidably mountable in said left track of left side 282, said right track of right side 290 and said underside groove of top plate 294. Middle backing piece 298 has a second pair of backside tracks, said middle backing piece being slidably mountable in said left track and said right track and being interlockable with upper backing piece 296. Top left bracing piece 300 is slidably mountable in one of said first pair of backside tracks and in one of said second pair of backside tracks. Top right bracing piece 308 is slidably mountable in the other of said first pair of backside tracks and in the other of said second pair of backside tracks. Lower backing piece 304 has a third pair of backside tracks, said lower backing piece being slidably mountable in said left track and said right track and being interlocked with middle backing piece 298. Bottom left bracing piece 306 is slidably mountable in one of said second pair of backside tracks and in one of said third pair of backside tracks. Bottom right bracing piece 308 is slidably mountable in the other of said second pair of backside tracks and in the other of said third pair of backside tracks.

Figure 10:
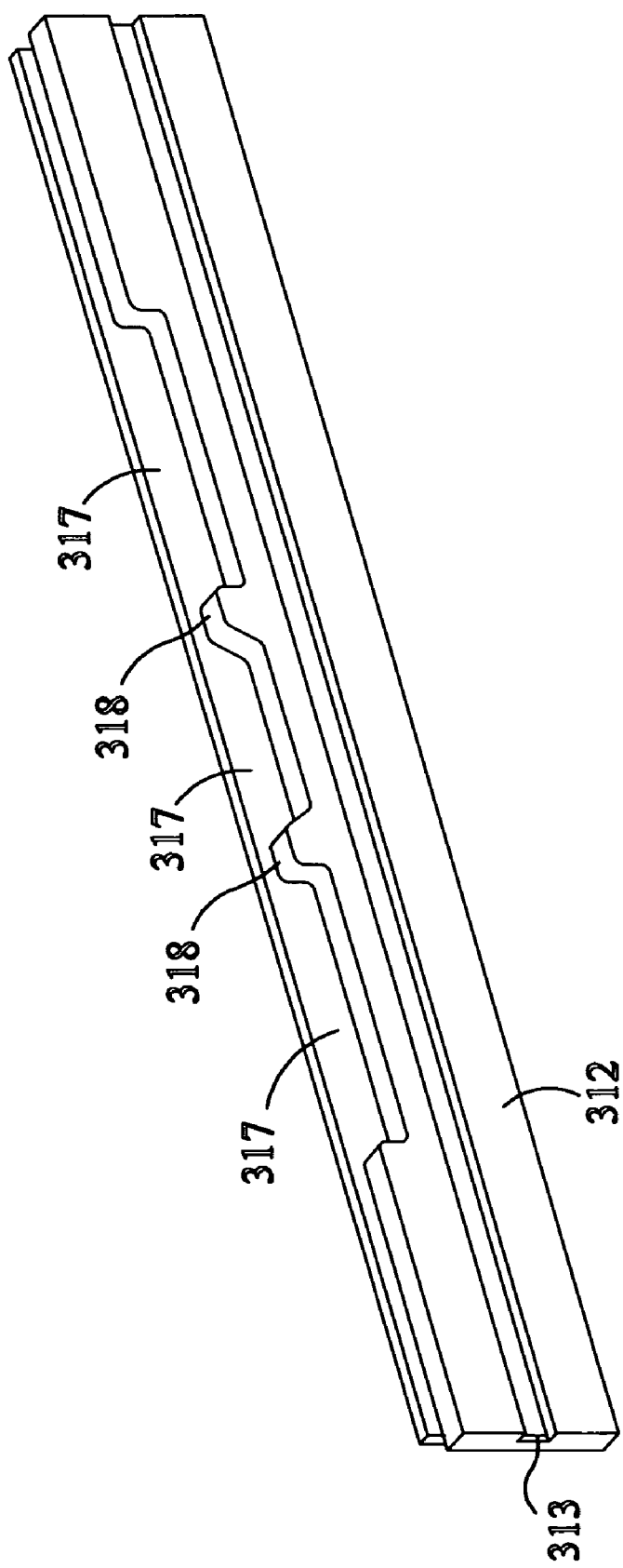
FIG. 10 is a perspective view of the back toe kick of a preferred embodiment of the invention.

Referring to FIG. 10, back toe kick 312 has horizontal track 313 and is slidably mountable in the first back vertical groove of left side 282 and in the second back vertical groove of right side 290. It is interlockable with toe brace back piece 310, lower backing piece 304, bottom left bracing piece 306 and bottom right bracing piece 308 by means of indents 317 and protrusions 318.

Figure 11:
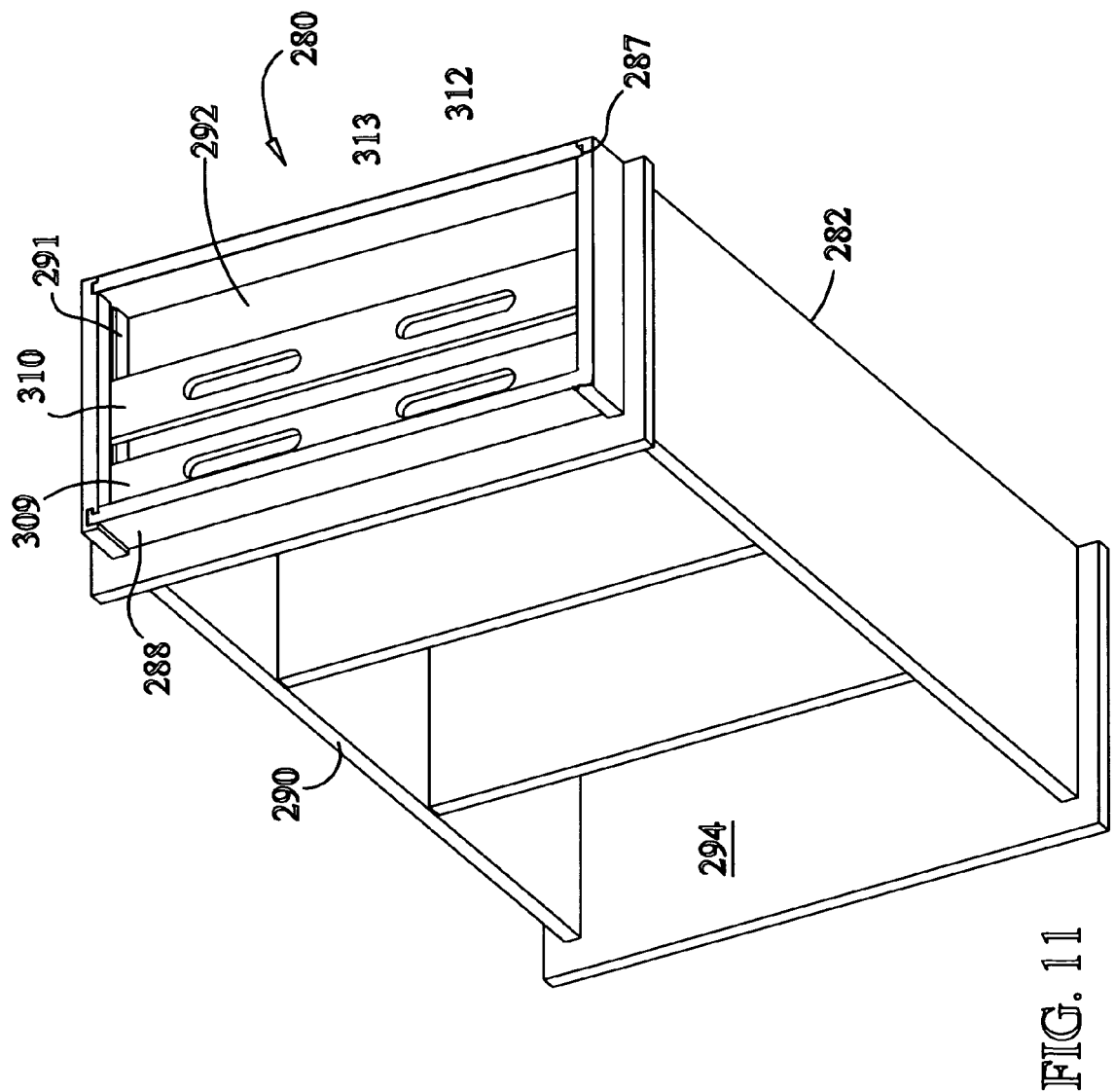
FIG. 11 is a partial bottom perspective view of the bookshelf of a preferred embodiment of the invention before the back toe kick has been locked in place.

Referring to FIG. 11, toe brace back piece 310 is slidably mountable the first horizontal groove of left side kick 284 and the second horizontal groove 295 of right side kick 286. Initially, toe brace back piece 310 is located in the middle of these grooves, as shown here, and then it is moved to the back of these grooves.

Quadrilateral 280 is preferably supplied in kit form and assembled where it is to be used. An initial step involves sliding top plate 294 back into the top grooves of right side 290 and left side 282 until it can move back no further as shown in FIG. 9. The next step involves slide said bottom plate into said left side cutout and said right side cutout. The next step involves sliding first shelf 314 and second shelf 316 into their respective grooves located on the inside surfaced right side 290 and left side 282.

With the frame assembled, the next step involves sliding upper backing piece 296 and middle backing piece 298 into the track located at the back of right side 290 and left side 282, starting from the back bottom of the bookshelf, stopping sliding them up when middle backing piece 298 is halfway inserted. With the middle backing section now extending halfway out of the grooved entry, the next step involves sliding the top two bracing pieces, 300 and 302, into the respective tracks located on the back side of the backing pieces 296 and 298. Then, the next step involves sliding this four unit assembly up until it locks into the grooves located on the underside of top plate 294. The next step involves sliding the remaining backing piece, 304 up into the track until it locks with middle backing piece 298. Then, the next step involves sliding the remaining two bracing pieces, 306 and 308, into the respective tracks located on the backside of the bottom backing piece 304.

The next step involves sliding toe brace front piece 309 into first horizontal groove 291 and second horizontal groove 295. The next step involves sliding toe brace back piece 310 until it is in the middle of first horizontal groove 291 and second horizontal groove 295 as shown in FIG. 11. The next step involves sliding back toe kick up into the back vertical grooves 287 and 297 located at the back ends of right side 290 and left side 284 until it locks into backing piece 304 and bracing pieces 306 and 308 located at the bottom back area of the bookshelf. The final step involves sliding toe brace back piece 310 back until it locks into back toe kick 312.

In a preferred embodiment, bookshelf 280 is constructed of materials having a density that is high enough that it can hold the complex edge conditions that will be expected from it, not only during the manufacturing process but over time, as well when the unit is being assembled and disassembled. Preferred materials include Woodstalk® material made by Dow chemical and plastics.

In another preferred embodiment, quadrilateral 280 comprises frame 320 (comprising right side 290, left side 286, and top plate 294); upper backing piece 296; middle backing piece 298; top left bracing piece 300; top right bracing piece 302; lower backing piece 304; bottom left bracing piece 306; and bottom right bracing piece 308. Frame 320 has a left track, a right track and a groove. Upper backing piece 296 has a first pair of backside tracks and is slidably mountable in said left track, said right track and said groove. Middle backing piece 298 has a second pair of backside tracks and is slidably mountable in said left track and said right track and is interlocked with upper backing piece 296. Top left bracing piece 300 is slidably mountable in one of said first pair of backside tracks and in one of said second pair of backside tracks. Top right bracing piece 302 is slidably mountable in the other of said first pair of backside tracks and in the other of said second pair of backside tracks. Lower backing piece 304 has a third pair of backside tracks, said lower backing piece being slidably mountable in said left track and said right track and being interlocked with middle backing piece 298. Bottom left bracing piece 306 is slidably mountable in one of said second pair of backside tracks and in one of said third pair of backside tracks. Bottom right bracing piece 308 is slidably mountable in the other of said second pair of backside tracks and in the other of said third pair of backside tracks.

Figure 12:
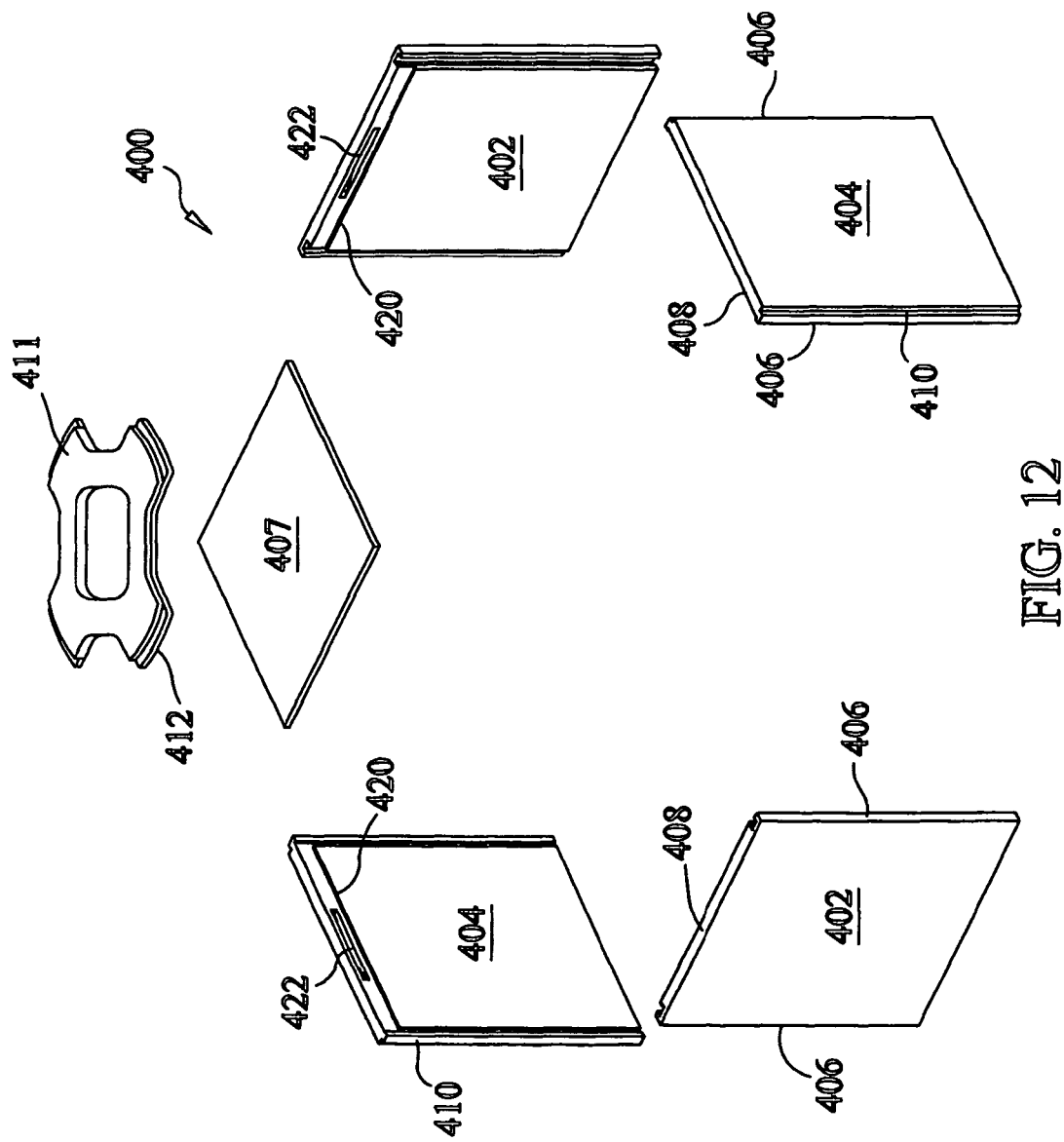
FIG. 12 is an exploded view of a preferred embodiment of a cube structure that incorporates aspects of the invention.

Referring to FIG. 12, a preferred embodiment of cube structure 400 that incorporates aspects of the invention is presented. In this embodiment, cube structure 400 comprises first pair of side components 402, second pair of side components 404, backer component 406 and rotational lockdown component 408. Each of said side components is preferably rectangular or square in overall shape has edges. Two of said edges are substantially parallel edges 406 and third edge 408 is substantially perpendicular to said substantially parallel edges. Each of said side components is provided with ledge 420 and radial slot 422 that is oriented substantially parallel to said third edge 408. Each of substantially parallel edges 406 of first pair of side components 404 has one of a pair of cube tenons 410. Each of the substantially parallel edges 406 of second pair of side components 402 has one of a pair of cube mortises 410. One of said pairs of cube tenons 410 slidably fits into one of said pair of cube mortises 410 and another of said pairs of cube tenons 410 slidably fits into another of said pair of cube mortises 410, making interlocking joints. Backer component 407 rests on ledge 420. Rotational lockdown component has radial tabs 412 that fit into radial slots 422 when rotational lockdown component 411 is placed on backer component 407 and rotated about 45 degrees. While radial tabs 412 are illustrated as having a uniform thickness in this view, they may vary in thickness with the leading edge being slightly thinner to facilitate their insertion in radial slots 422. Alternatively, the vertical height of radial slots may vary, for the same reason.

Figure 13:
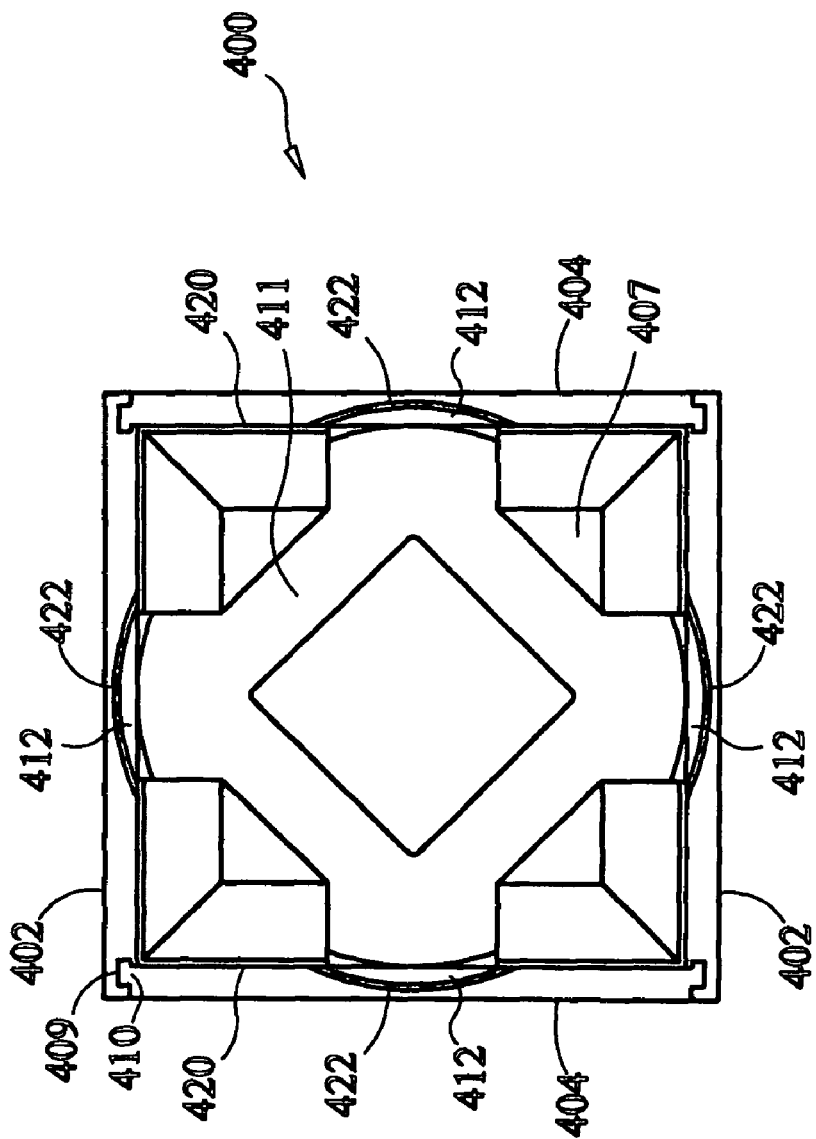
FIG. 13 is a top perspective view of an assembled version of the preferred embodiment of the cube structure of FIG. 12.

Referring to FIG. 13, another view of the preferred embodiment of FIG. 12 is presented. Cube tenons 410 are engaged with cube mortises 409 in an alternative embodiment of flush joint system 160. In this embodiment, the cantilever portions of cube tenons 410 extend beyond the adjacent inside surface of sides 404. Backer component 407 rests on ledge 420 which is incorporated into both pairs of sides 402 an 404. In that sides 402 and 404 and backer component 407 are constructed of a transparent material in this embodiment, radial tabs 412 can be seen to be rotated into radial slots 422.

Figure 15:
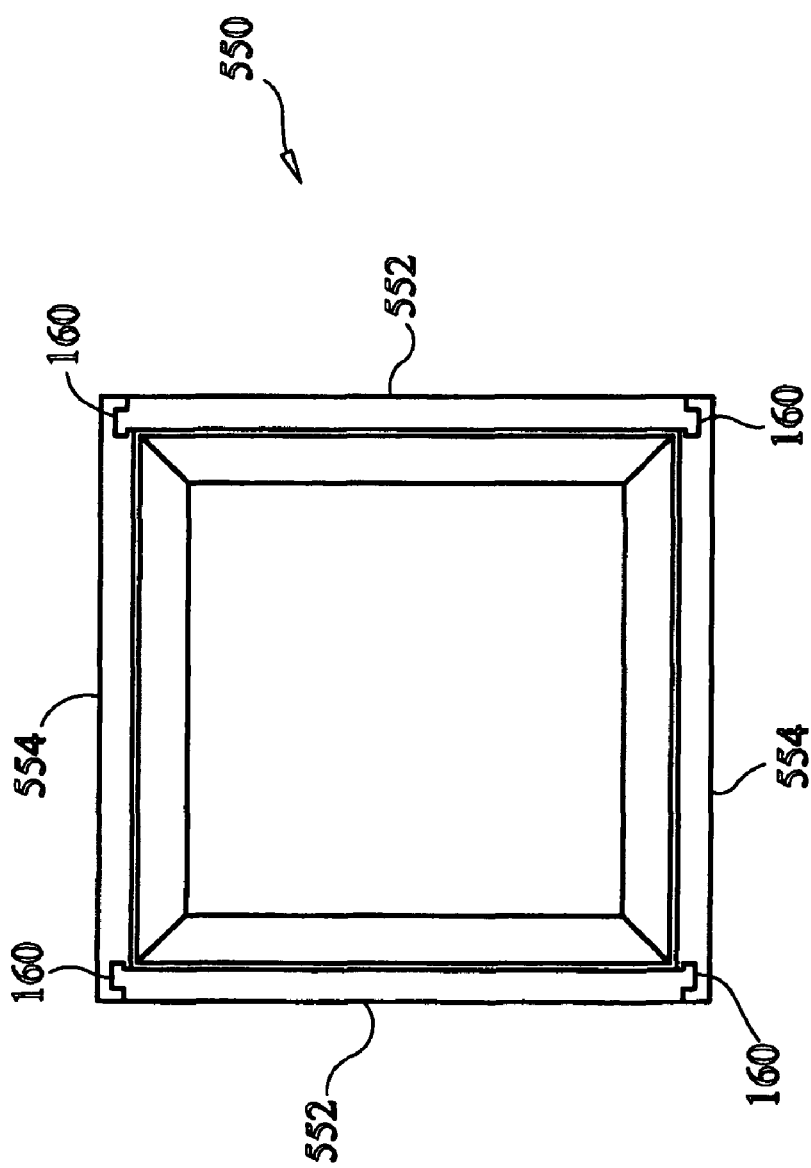
FIG. 15 is a top plan view of a preferred embodiment of the invention in a partially assembled state, showing the asymmetrical orientation of the corner joints.

In an alternative embodiment shown in FIG. 15, one of the substantially parallel edges 406 of each of first pair of side components 404 incorporates one of the cube tenons 410 and the other of the substantially parallel edges 406 of each of first pair of side components 404 incorporates one of the cube mortises 409. The edges 406 of each of second pair of side components 402 incorporate an appropriate one of the cube mortises 409 and one of the cube tenons 410. In this embodiment, then, the side components are asymmetrical.

In preferred embodiments, cube mortises 409 and cube tenons 410 are configured to incorporate one of the joint systems disclosed herein. In a more preferred embodiment, cube mortises 409 and cube tenons 410 are configured to incorporate flush joint system 160.

Assembly of cube structure 400 involves sliding cube tenons 410 into cube mortises 409 to form a four-sided structure. The next step involves resting backer component 407 on ledge 420. The final step involves placing rotational lockdown component 411 on backer component 407 and rotating it about 45 degrees to engage radial tabs 412 in radial slots 422.

Figure 14:
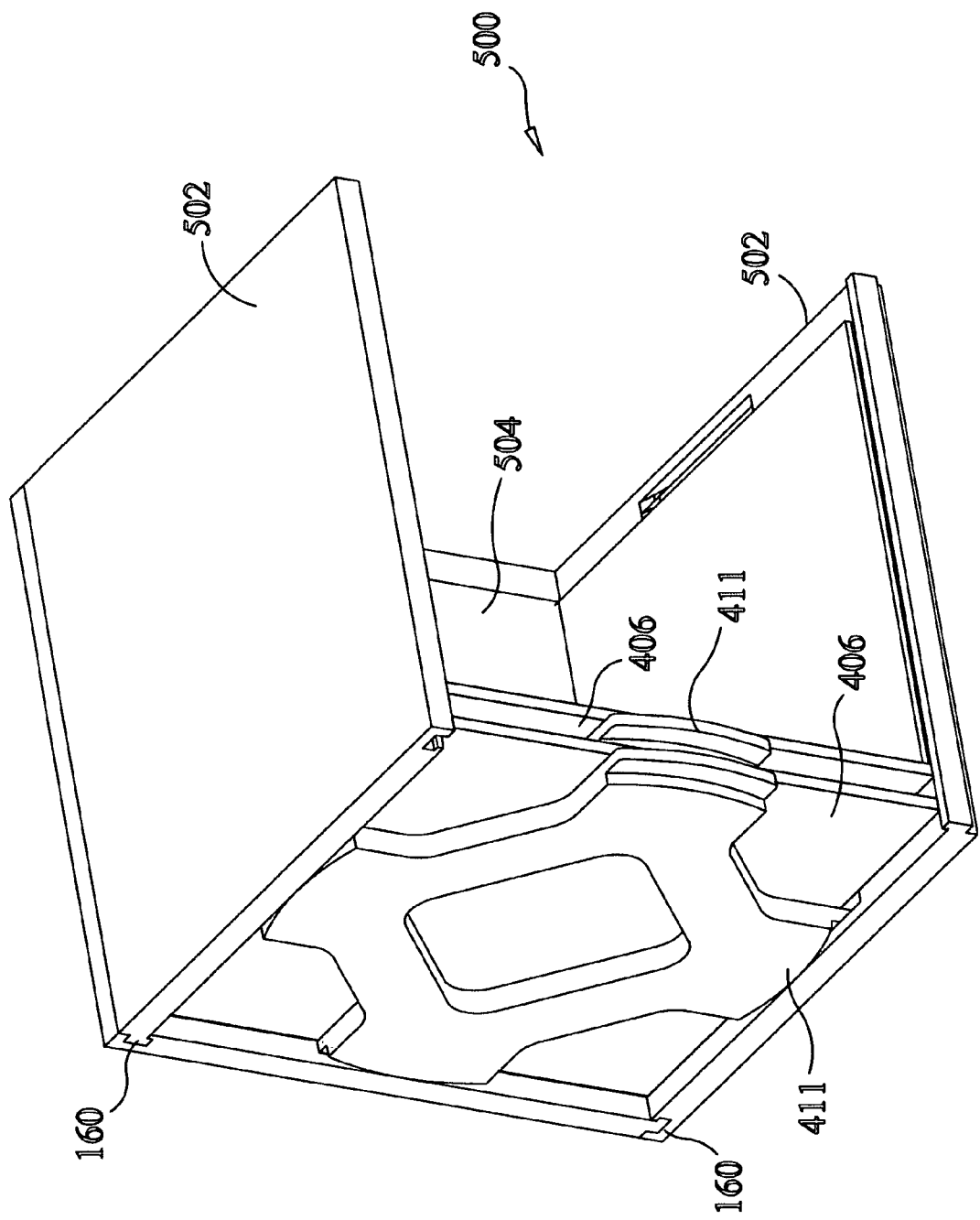
FIG. 14 is a perspective view of a preferred embodiment of the invention in a partially assembled state, with one side removed for clarity.

Referring to FIG. 14, another preferred embodiment of storage structure 500 that incorporates other aspects of the invention is presented. In this embodiment, storage structure 500 comprises first pair of storage side components 502, second pair of storage side components 504, three backer components 406 (two of which are shown), three rotational lockdown components 411 (two of which are shown). A person having ordinary skill in the art would realize that storage structure 500 could incorporate any number of rotational lockdown components and associated backer components.

Referring to FIG. 15, a preferred embodiment of asymmetrical cube structure 550 is presented. In this embodiment, asymmetrical cube structure 550 comprises first pair of asymmetrical side components 552, second pair of asymmetrical side components 554, a backer component (not shown) and a rotational lockdown component (not shown). This embodiment illustrates the fact that preferred embodiments of the invention may comprise asymmetrical side components joined together by means of an embodiment of flush joint system 160 disclosed herein.

Figure 16:
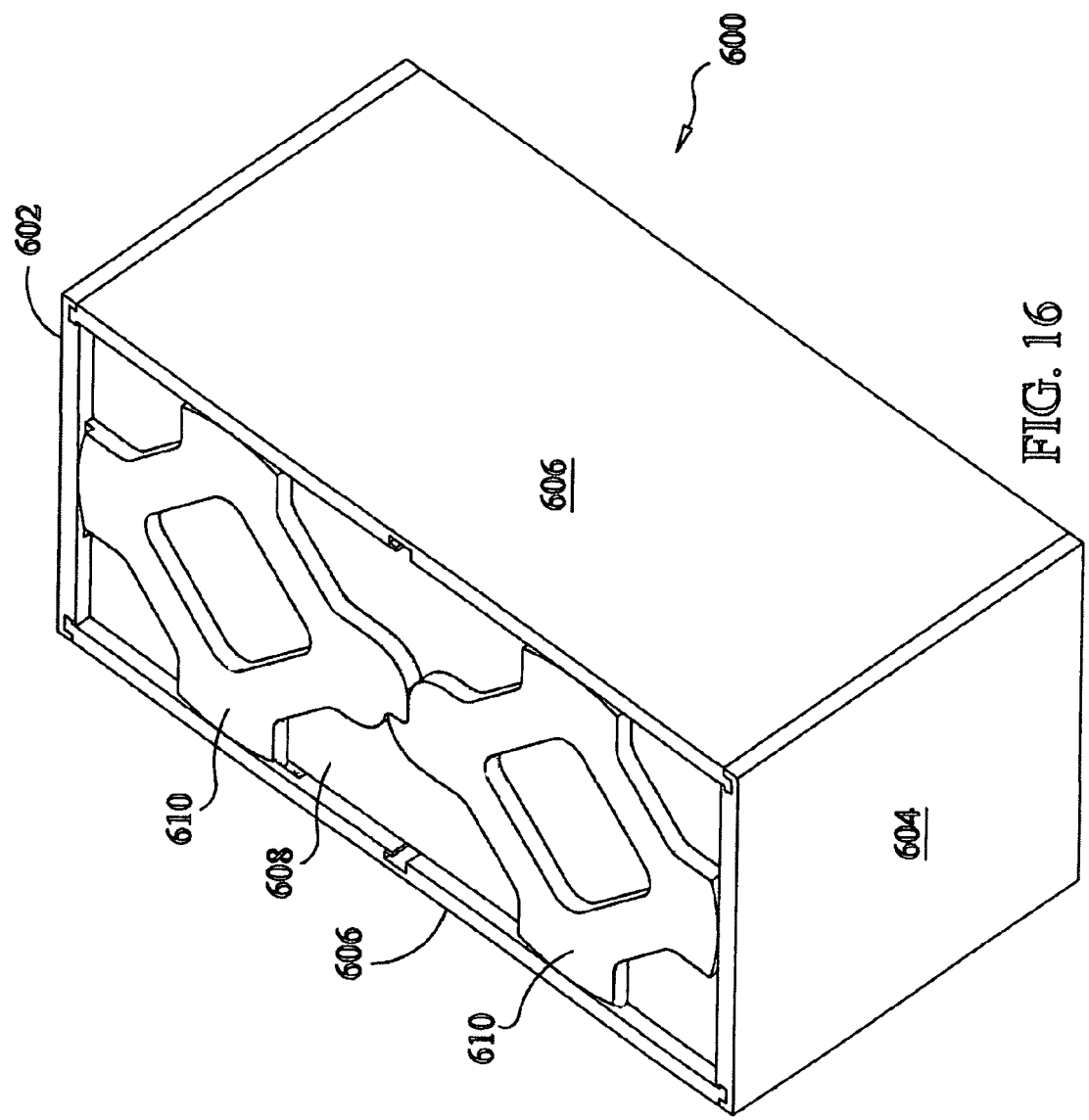
FIG. 16 is a perspective view of another preferred embodiment of the invention that comprises a plurality of interlocking rotational lockdown components.
Figure 17:
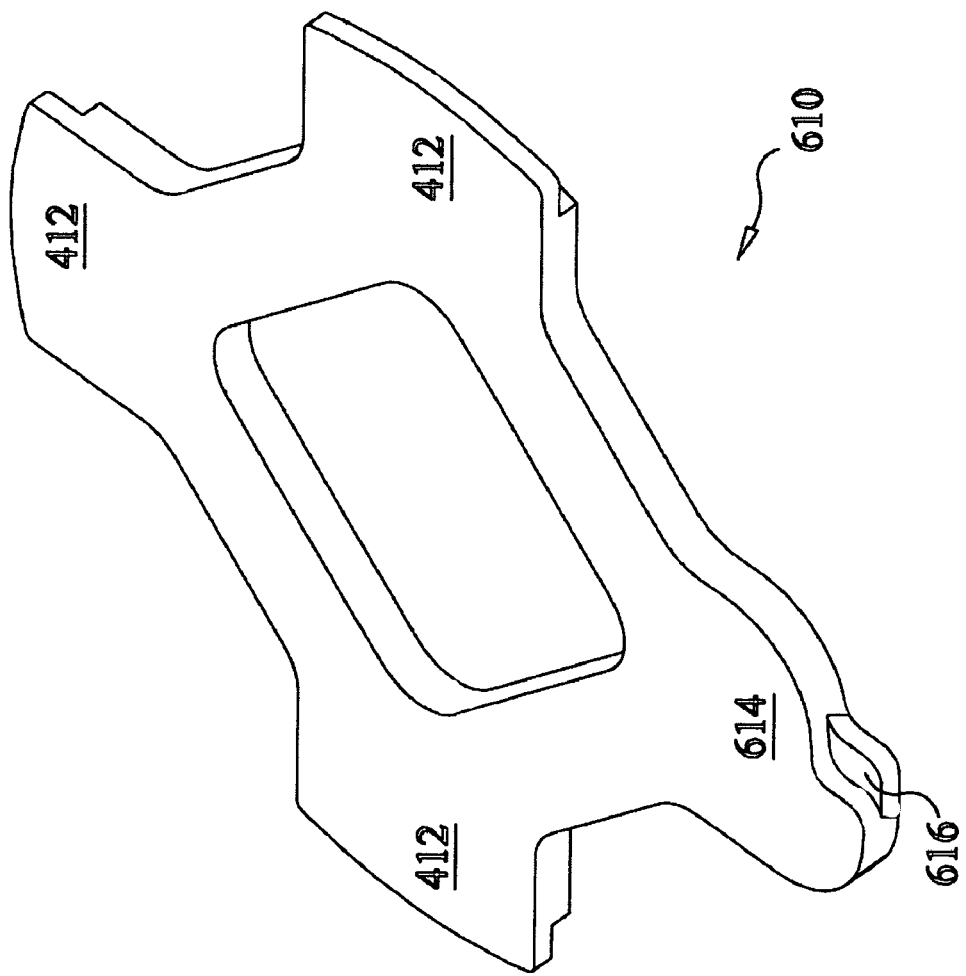
FIG. 17 is a perspective view of an interlocking rotational lockdown component of a preferred embodiment of the invention.

Referring to FIG. 16, a preferred embodiment of shelf storage structure 600 is presented. In this embodiment, shelf structure 600 comprises top component 602, bottom component 604, two slotted side components 606, back component 608 and two interlocking rotational lockdown components 610. In this embodiment, in addition to radial tabs 412, components 610 also comprise interlocking grips 614 as shown in FIG. 17. One of the interlocking grips comprises lower tab extension 616 and the other comprises an upper tab (not shown). A person having ordinary skill in the art would understand that shelf storage structure 600 may comprise any number of interlocking rotational lockdown components 610. If more than two interlocking rotational lockdown components 610 are provided, then each component 610 that does not interlock with top component 602 or bottom component 604 has two interlocking grips 614.

Referring to FIG. 18, the preferred embodiment of shelf storage structure 600 of FIG. 16 is shown in an upright position, with storage shelf 618 installed. In this embodiment, slotted side components 606 are preferably joined to top component 602 and bottom component by an embodiment of means of flush joint system 160 disclosed herein. Storage shelf 618 is preferably attached to slotted side components 606 by means of shelf joint systems 10. A person having ordinary skill in the art would recognize that a simple slot or another conventional means may also be used to support storage shelf 618 and that any number of shelves 618 may be incorporated into shelf storage structure 600.

Referring to FIG. 19, a preferred embodiment of stool structure 650 is presented. In this embodiment, stool structure 650 comprises backer 407, round rotational lockdown 652 and four arches 654. Arches 654 are preferably connected by means of an embodiment of flush joint system 160 disclosed herein. When stool structure 650 is assembled, the top surface of round rotational lockdown 652 is preferably situated above the tops of arches 654 and radial tabs 412 are situated in radial slots 422. In a preferred embodiment (shown in FIG. 20), round rotational lockdown 652 has undercuts 653 that allow the user's hands to wrap around its underside and turn it like a steering wheel.

Figure 21:
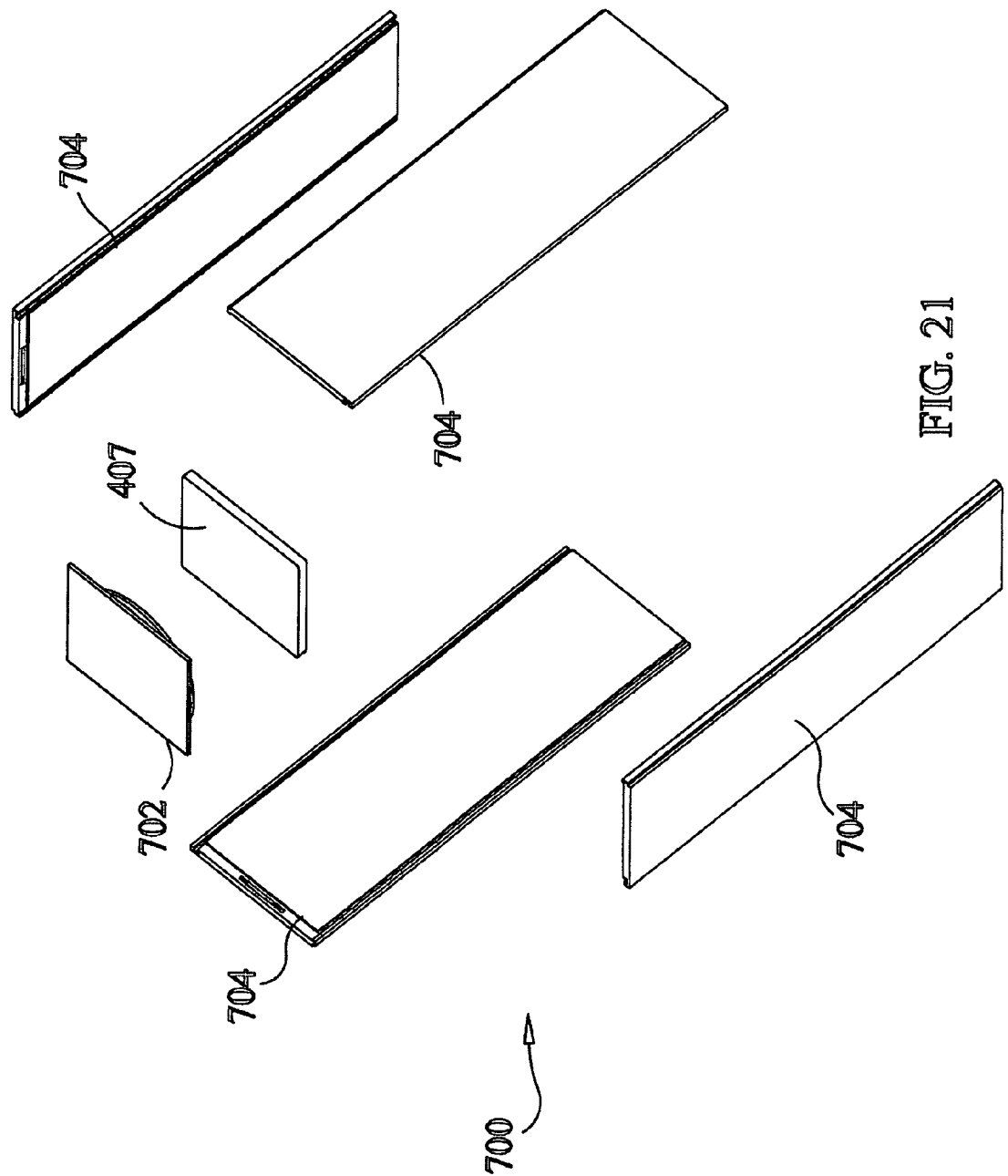
FIG. 21 is an exploded view of a preferred pedestal embodiment of the invention.

Referring to FIG. 21, a preferred embodiment of pedestal structure 700 is presented. In this embodiment, pedestal structure 700 comprises backer 407, square rotational lockdown 702 and four pedestal sides 704. Pedestal sides 704 are preferably connected by means of an embodiment of flush joint system 160 disclosed herein. When pedestal structure 700 is assembled, outer edges 706 of square rotational lockdown 702 preferably rest on the tops of pedestal sides 704 and radial tabs 412 are situated in radial slots 422. As illustrated in FIG. 22, square rotational lockdown 702 preferably has square corners so that when its rotation is complete its sides are flush with the outer surfaces of pedestal sides 704 and the underside of square rotational lockdown 702 is not visible to the user.

A person skilled in the art would understand that the joint systems and furniture components disclosed herein may be used in different combinations from the preferred embodiments illustrated herein. For example, the applicant has envisioned a dresser (chest of drawers) in which the main rectangular frame incorporates the diamond back bracing system disclosed herein and the drawers incorporate the two rotational lockdown components. Multiple rotational lockdown components could be incorporated into many of the structures disclosed herein. Many other combinations are possible.

Many variations of the invention will occur to those skilled in the art. Some variations include providing components having shapes similar to those illustrated herein. Other variations call for providing components that are functionally equivalent to those illustrated herein. All such variations are intended to be within the scope and spirit of the invention.

Although some embodiments are shown to include certain features, the applicant specifically contemplates that any feature disclosed herein may be used together or in combination with any other feature on any embodiment of the invention. It is also contemplated that any feature may be specifically excluded from any embodiment of an invention.

What is claimed is:

1. A kit for a structure, said kit comprising:
    four side components, each of said four side components comprising two substantially parallel planar surfaces, a substantially planar ledge connecting said two substantially parallel planar surfaces and a radial slot disposed in one of said substantially parallel planar surfaces and being attachable to another two of said side components to form a quadrilateral;
    a backer component that is configured to rest on said ledges; and
    at least one rotational lockdown component having radial tabs that fit into said radial slots when said at least one rotational lockdown component is placed on said backer component and rotated;
    wherein two of said four side components have tenons disposed along two edges and another two of said four side components have mortises disposed along two edges or all of said four side components have a tenon disposed along a first edge and a mortise disposed along a second edge.

2. The kit of claim 1 wherein a pair of rotational lockdown components are disposable adjacent to one another and wherein each of said pair of rotational lockdown components has an interlocking tab extension.

3. The kit of claim 1 wherein two of said four side components are provided with at least one shelf mortise and said kit further comprises:
    at least one storage shelf having ends, each end comprising a storage shelf tenon.

4. The kit of claim 1 wherein each of said four side components has an arch shape and said at least one rotational lockdown component is a round rotational lockdown that has an underside and undercuts that are operative to allow a user's hands to wrap around the underside of said round rotational lockdown and turn it.

5. The kit of claim 1 wherein each of said four side components has a width, a height and an outer surface, said height being substantially greater than said width and said at least one rotational lockdown component is a square rotational lockdown that has sides, an underside and square corners so that when rotation of said square rotational lockdown is complete said sides are flush with the outer surfaces of said four side components and the underside of square rotational lockdown is not visible.

6. A kit for a structure, said kit comprising:
    four side components, each of said four side components having a ledge and a radial slot and being attachable to another two of said side components to form a quadrilateral;
    a backer component that is configured to rest on said ledges; and
    at least one rotational lockdown component having radial tabs that fit into said radial slots when said at least one rotational lockdown component is placed on said backer component and rotated;
    wherein two of said four side components have tenons disposed along two edges and another two of said four side components have mortises disposed along two edges or all of said four side components have a tenon disposed along a first edge and a mortise disposed along a second edge.

* * * * *